United States Patent
Tobens, III et al.

(10) Patent No.: US 10,203,843 B2
(45) Date of Patent: Feb. 12, 2019

(54) FACILITATING SELECTION OF ATTRIBUTE VALUES FOR GRAPHICAL ELEMENTS

(71) Applicant: Microsoft Technology Licensing, LLC, Redmond, WA (US)

(72) Inventors: Joseph Bernard Tobens, III, Seattle, WA (US); Gyancarlo García Avilla, Kenmore, WA (US); Andrew Stuart Glass, Seattle, WA (US); Corey Joseph Loman, Philadelphia, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 404 days.

(21) Appl. No.: 14/884,721

(22) Filed: Oct. 15, 2015

(65) Prior Publication Data

US 2017/0083174 A1    Mar. 23, 2017

Related U.S. Application Data

(60) Provisional application No. 62/221,592, filed on Sep. 21, 2015.

(51) Int. Cl.
*G06F 3/0484* (2013.01)
*G06F 3/0482* (2013.01)
(Continued)

(52) U.S. Cl.
CPC .......... *G06F 3/0482* (2013.01); *G06F 3/0237* (2013.01); *G06F 3/0485* (2013.01);
(Continued)

(58) Field of Classification Search
CPC .............. G06F 3/04817; G06F 3/0482; G06F 3/04883; G06F 3/0485; G06F 3/0484; G06F 3/04845
See application file for complete search history.

(56) References Cited

U.S. PATENT DOCUMENTS

2003/0060937 A1* 3/2003 Shinada ............. G01C 21/3641
                                                                      701/1
2010/0125811 A1    5/2010 Moore et al.
(Continued)

OTHER PUBLICATIONS

Emoji++ for iOS 8 Is the Best Alternative to Emoji Keyboard for iPhone (Oct. 3, 2014) http://cupertinotimes.com/emoji-ios-8-best-alternative-emoji-keyboard-iphone/.*
(Continued)

*Primary Examiner* — Rinna Yi

(74) *Attorney, Agent, or Firm* — Rainier Patents, P.S.

(57) ABSTRACT

A computer-implemented technique is described herein for facilitating a user's interaction with graphical elements, such as emoji characters. The technique entails: presenting a collection of graphical elements on a display surface of a user interface mechanism; presenting a selector mechanism on the display surface that provides a plurality of attribute value options (such as skin tone options); receiving a selection by the user of one of the attribute value options, to provide a selected attribute value; globally modifying at least a subset of the graphical elements in the collection based on the selected attribute value, and displaying those modified graphical elements. In one approach, the technique presents the collection of graphical elements in an array that is capable of being panned along at least a first axis of movement. The technique reveals the selector mechanism when the user pans the array along a second axis of movement.

20 Claims, 15 Drawing Sheets

(51) Int. Cl.
*G06F 3/0485* (2013.01)
*G06F 3/0488* (2013.01)
*G06F 3/023* (2006.01)
*G06F 3/0481* (2013.01)

(52) U.S. Cl.
CPC ........ *G06F 3/0488* (2013.01); *G06F 3/04842* (2013.01); *G06F 3/04845* (2013.01); *G06F 3/04847* (2013.01); *G06F 3/04817* (2013.01); *G06F 3/04883* (2013.01)

(56) References Cited

U.S. PATENT DOCUMENTS

| | | |
|---|---|---|
| 2011/0234504 A1 | 9/2011 | Barnett et al. |
| 2013/0326421 A1* | 12/2013 | Jo .................. G06F 3/0482 715/841 |
| 2014/0019885 A1* | 1/2014 | Jung ................ G06F 3/0481 715/758 |
| 2014/0214409 A1 | 7/2014 | Leydon |
| 2014/0279418 A1 | 9/2014 | Rubinstein et al. |
| 2015/0100537 A1 | 4/2015 | Grieves et al. |
| 2015/0220774 A1 | 8/2015 | Ebersman et al. |
| 2016/0259502 A1* | 9/2016 | Parrott .............. G06F 3/0482 |

OTHER PUBLICATIONS

Search Report and Written Opinion for PCT/US2016/048812, dated Nov. 9, 2016, 11 pages.
Horowitz, Paul, "Lose the Cartoon Yellow People Emoji! How to Access Diverse Emoji Icons in iOS," available at <<http://osxdaily.com/2015/04/11/how-access-diverse-emoji-icons-ios/>>, OSXDaily, published on Apr. 11, 2015, 8 pages.
"How to Use New Emojis on iOS 8.3," available at <<https://www.youtube.com/watch?v=eEAXWu404vE>>, by Saint Huang TV, YouTube, three screen shots, published on Apr. 9, 2015, 4 pages.
Walmsley, Will, "Mini Mode Mods, Speed Improvements, A *New Emoji* and More!," available at <<http://minuum.com/category/ios/>>, Minuum, published on May 19, 2015, 22 pages.
El Khoury, Rita, "[Live Long and Prosper] Whatsapp Adds Skin Tone Emojis and Spock Vulcan Salute on Android," available at <<http://www.androidpolice.com/2015/06/30/live-long-and-prosper-whatsapp-adds-skin-tone-emojis-and-spock-vulcan-salute-on-android/>>, Android Police, published on Jun. 30, 2015, 4 pages.
Clover, Juli, "OS X 10.10.3 and iOS 8.3 Beta 2 Updates Introduce New Emoji, Skin Tone Modifiers," available at <<http://www.macrumors.com/2015/02/23/10-10-3-new emoji/>>, MacRumors, published on Feb. 23, 2015, 9 pages.
Calore, Michael, "Use the New Emoji in Windows 10," available at <<http://www.wired.com/2015/07/new-emoji-in-windows-10/>>, Wired, published on Jul. 29, 2015, 16 pages.
Calimlim, Aldrin, "6 emoji keyboard apps for iOS to help you say more," available at <<http://appadvice.com/appnn/2015/07/6-emoji-keyboard-apps-for-ios-to-help-you-say-more>>, AppAdvice, published on Jul. 17, 2015, 20 pages.
"Settings + personalization," available at <<http://www.windowsphone.com/en-us/how-to/wp8/settings-and-personalization/typing-shortcuts>>, Windows Phone, Microsoft Corporation, retrieved on Sep. 22, 2015, 3 pages.
"RainbowKey Keyboard—color keyboard with HD background themes, fancy fonts and fun emoji," available at <<https://itunes.apple.com/us/app/rainbowkey-keyboard-color/id915637540?mt=8>>, by Keyboard+, iTunes Preview, retrieved on Sep. 22, 2015, 3 pages.
"Change Android Emoji Characters without Root," available at <<https://www.youtube.com/watch?v=ha8zJe2aFEU&feature=youtu.be>>, by Fonts Free, YouTube, three screen shots, published on Mar. 22, 2015, 5 pages.
Cantisano, Tim, "Diverse emojis arrive on Windows 10 build 10547," available at <<http://www.neowin.net/news/diverse-emojis-arrive-on-windows-10-build-10547>>, Neowin LLC, retrieved on Sep. 22, 2015, 3 pages.
Weir, Andy, "Windows 10 Mobile Insider Preview build 10547 is now being tested," available at <<http://www.neowin.net/news/windows-10-mobile-insider-preview-build-10547-is-now-being-tested>>, Neowin LLC, retrieved on Sep. 22, 2015, 2 pages.
Smith, David, "Emoji++ 1.2 with the new emoji skin tones is now available. Options at bottom of main list," available at <<https://mobile.twitter.com/_davidsmith/status/618065629631877120>>, Twitter, Inc., Jul. 6, 2015, 2 pages.
"Second Written Opinion Issued in PCT Application No. PCT/US2016/048812", dated Aug. 25, 2017, 7 Pages.
"International Preliminary Report on Patentability Issued in PCT Application No. PCT/US2016/048812", dated Dec. 7, 2017, 8 Pages.

* cited by examiner

FACILITATING SELECTION OF ATTRIBUTE VALUES FOR GRAPHICAL ELEMENTS

This application claims the benefit of U.S. Provisional Application No. 62/221,592 (the '592 Application), filed on Sep. 21, 2015. The '592 Application is incorporated by reference herein in its entirety.

BACKGROUND

Users of computing devices commonly add emoji characters to messages. An emoji character is a graphical element that represents a concept. Many emoji characters, for instance, represent human beings and other animals. More specifically, many emoji characters represent different human expressions and activities.

Emoji characters often use a prominent neutral skin tone, such as yellow. Recently, the computing industry has offered mechanisms that allow a user to change the skin tone of an individual emoji character. For instance, a user having an olive complexion may wish to change an individual emoji character so that it similarly has an olive skin tone. However, mechanisms for changing skin tone in use today can be difficult to discover, and once discovered, cumbersome to use.

SUMMARY

A computer-implemented technique is described herein for facilitating a user's interaction with graphical elements, such as emoji characters. In one manner of operation, the technique entails: presenting a collection of graphical elements on a display surface of a user interface mechanism; presenting a selector mechanism on the display surface that provides a plurality of attribute value options (such as skin tone options); receiving a selection by the user of one of the attribute value options, to provide a selected attribute value; globally modifying at least a subset of the graphical elements based on the selected attribute value, and displaying those modified graphical elements.

In one approach, the technique presents the collection of graphical elements in an array that is capable of being panned along at least a first axis of movement. The technique reveals the selector mechanism when the user pans the array along a second axis of movement. By virtue of this operation, the technique ensures that the user can efficiently access the selector mechanism regardless of the user's position along the first axis of movement. The technique further provides an efficient mechanism by which the user can change the attribute values of plural graphical elements, rather than, for example, requiring the user to individually configure each graphical element.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
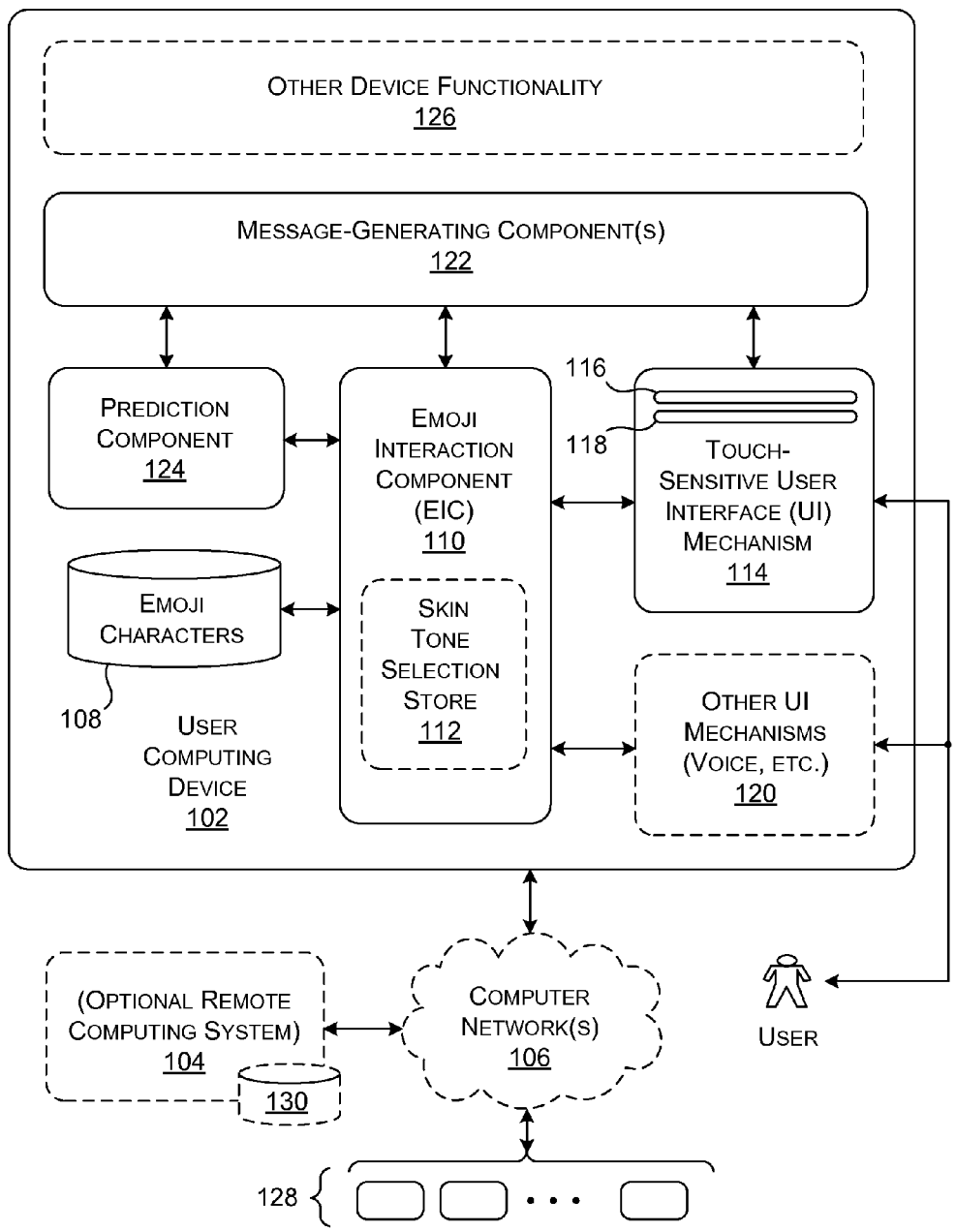
FIG. 1 shows a computing device having an emoji interaction component that allows a user to interact with a collection of emoji characters.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for facilitating a user's interaction with graphical elements. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, however implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows a computing device 102 that allows a user to efficiently modify one or more attribute values of graphical elements. Subsection A.1 and A.2 explain the operation of the computing device 102 for the case in which the graphical elements correspond to emoji characters. Subsection A.3 generalizes the examples of Subsections A.1 and A.2 to other types of graphical elements and other use case scenarios.

An emoji character, as the term is used herein, refers to a graphical element that represents any concept, such as a mood, object, activity, etc. An emoji character has a principal surface, referred to as a skin. In some cases, an emoji character represents a human being, and the skin represents the literal skin associated with that human being. In other cases, the skin more generally represents the outward surface of whatever object the emoji character depicts, including any kind of inanimate object or fanciful figure.

The skin of an emoji character is characterized by a skin tone. In many cases, the skin tone refers to the color of the emoji character's skin. In other cases, the skin tone may be characterized by one or more other attribute values, in addition to color, or instead of color. For example, the skin tone may also be defined by a level of transparency associated with the emoji character's skin. To facilitate explanation however, it will henceforth be assumed that the skin tone refers to only the color of an emoji's character's skin.

In some cases, an emoji character may have a variable skin tone attribute associated therewith. An emoji character having a variable skin tone attribute can be displayed in different skin tones, depending on the value to which the skin tone attribute is set. Other emoji characters do not have a variable skin tone attribute, e.g., because they have a fixed skin tone attribute value.

The computing device 102 may correspond to any user computing device of any nature. For example, the computing device 102 may correspond to a stationary workstation personal computing device, a laptop computing device, a set-top box device, a game console device, a tablet-type computing device, a smartphone or other type of telephone device, a wearable computing device, and so on. In one implementation, the computing device 102 implements all of the functions to be described below. But in another case, one or more of the features to be described below can be implemented, in whole in part, by a remote computing system 104. The remote computing system 104 may represent one or more server computing devices, together with other computing equipment, such as routers, load balancers, etc. One or more computer networks 106 may communicatively couple the computing device 102 to the remote computing system 104. The computer network(s) 106 may correspond to a wide area network (e.g., the Internet), a local area network, one or more point-to-point communication links, or any combination thereof.

A data store 108 stores a collection of emoji characters. More specifically, the data store 108 stores a plurality of data items associated with respective emoji characters. Each data item contains data associated with an emoji character that defines the visual appearance of the emoji character, when displayed. For example, a data item may provide a bit map that describes an emoji character, or a vector representation of the emoji character, etc. As will be described below, each emoji character may be denoted by one or more codes, and the data store 108 may also store these code(s) for each emoji character.

An emoji interaction component (EIC) 110 represents a central engine for presenting the collection of emoji characters and allowing a user to interact with the emoji characters. For instance, the EIC 110 can provide functionality (to be described in detail below) which allows a user to select a skin tone. The EIC 110 stores the selected skin tone in a skin tone selection store 112. The skin tone describes at least the color of the skin for all those emoji characters that have variable skin tone attributes.

The user may interact with the EIC 110 via one or more user interface UI mechanisms. One such mechanism is a touch-sensitive UI mechanism 114. The touch-sensitive UI mechanism 114 includes a display surface 116 for providing a user interface presentation, and a touch-sensitive surface 118 for receiving input from the user when the user touches or otherwise engages the touch-sensitive surface 118. In one implementation, the touch-sensitive UI mechanism 114 combines the display surface 116 and the touch-sensitive surface 118 into a single integrated surface with which the user may interact with the EIC 110. In another case, the touch-sensitive UI mechanism 114 can provide physically separate instantiations of the display surface 116 and the touch-sensitive surface 118. For example, in this latter case, the touch-sensitive display surface 116 may be implemented by a digitizing pad or the like that is separate from the display surface 116.

In any implementation, the display surface 116 may represent a surface provided by a charge-coupled display device, a cathode ray tube display device, a projection mechanism, and so on. The touch-sensitive surface 118 can represent a resistive-type touch-sensitive device, a capacitive-type touch-sensitive device, an acoustic-type touch-sensitive device, an infrared-type touch-sensitive device, and so on.

The computing device 102 may also include other UI mechanisms 120, such as a physical keyboard device, a mouse input device, one or more video cameras, one or more depth camera devices, a free space gesture recognition mechanism (which may rely on the video and/or depth cameras), one or more microphones, a voice recognition mechanism, any movement detection mechanisms (e.g., accelerometers, gyroscopes, etc.), and so on.

Different applications may interact with the EIC 110 in the course of their operation. For example, a message-generating component 122 may interact with the EIC 110 in the course of the user's creation of a message, such as a text message, Email message, etc. In one manner of operation, the message-generating component 122 may display an EIC-activation icon. A user may activate the EIC-activation icon in the course of creating a message. In response to the user's action, the EIC 110 presents the collection of the emoji characters on the display surface 116. The user may select one or more of the emoji characters, which has the effect of adding these emoji characters to the message that the user is creating. The user may also use the EIC 110 to modify the skin tone of an emoji character in the manner to be described below, prior to adding it to the message.

As described in more detail below, each emoji character in a message can be denoted by one or more codes, like any other font character. The message-generating component 122 can thereby convey a message containing an emoji character to a recipient by sending the code(s) associated with the emoji character to the recipient. A recipient's computing device (not shown) can render the emoji character in the message based on the code(s) and the data item (e.g., bit map, vector representation, etc.) associated therewith (where, in one implementation, the data item can be locally stored by the recipient's computing device). The emoji codes may be standardized, such that a particular emoji character having a selected skin tone will have the same general appearance (including skin tone) when presented by a source computing device (operated by the user who created the message) and a target computing device (operated by the user who received the message).

A prediction component 124 receives message information that includes the characters and words that the user has specified thus far in the course of creating a message. In response, the prediction component 124 maps the message information to one or more predicted phrases, words, and characters, including emoji characters. For example, assume that the user types "I am angry" as an initial part of a message. The prediction component 124 may map that message information to an emoji character that expresses anger. The prediction component 124 can then present that emoji character for the user's consideration as a suggestion, giving the user the option to add that emoji character to the message being created. In one implementation, the prediction component 124 displays any predicted emoji character that has a variable skin tone attribute such that it adopts the skin tone that has been set by the user, corresponding to the skin tone value stored in the skin tone selection store 112.

The computing device 102 may also include any number of additional functional components 126 which are not directly relevant to the operation of the EIC 110, and will therefore not be specifically described herein.

Figure 2:
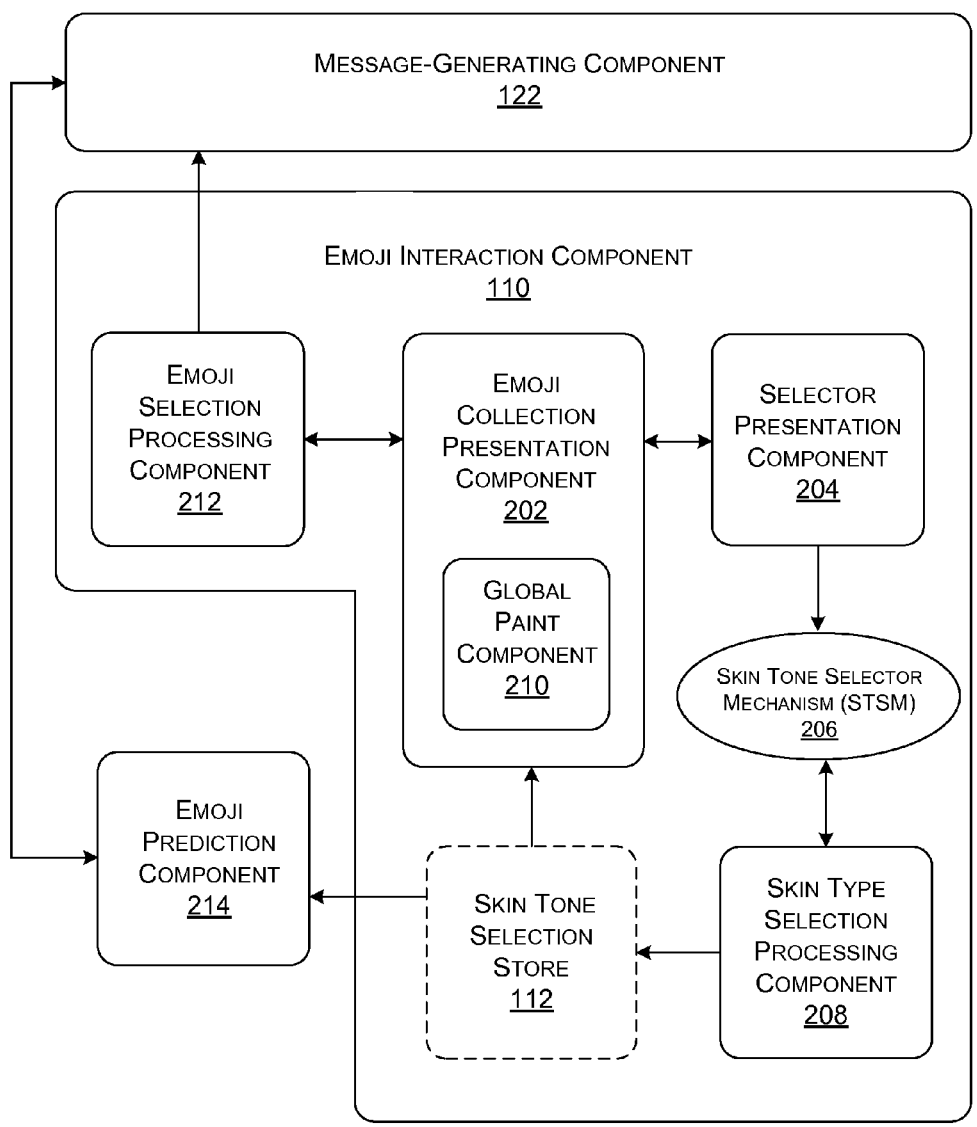
FIG. 2 shows one implementation of the emoji interaction component introduced in FIG. 1.

Advancing to FIG. 2, this figure shows one implementation of the emoji interaction component (EIC) 110 introduced in FIG. 1. The EIC 110 includes an emoji collection presentation component 202 for presenting a collection of emoji characters. The emoji collection presentation component 202 also handles the user's interaction with the collection of emoji characters, e.g., by panning the collection in response to a detected panning gesture. As used herein, the term "panning" encompasses any way in which a user may move through an array of emoji characters. In the examples featured herein, the user pans through the array of emoji characters by executing pan gestures on the touch-sensitive surface 118, e.g., by touching the touch-sensitive surface 118 with one or more fingers (or some other implement) and then moving his or her finger(s) in a desired direction across the surface 118.

The EIC 110 also includes a selector presentation component 204. The selector presentation component 204 presents a skin tone selector mechanism (STSM) 206. The STSM 206, in turn, corresponds to a graphical control feature that presents a plurality of skin tone options to the user. A user may engage the STSM 206 to select one of the skin tone options, to provide a selected skin tone, e.g., by touching one of the skin tone options on the touch-sensitive surface 118. When the user makes such a selection, a skin type selection processing component 208 stores the selected skin tone in the skin tone selection store 112.

The emoji collection presentation component 202 includes a global paint component 210. The global paint component 210 displays all visible emoji characters that have a variable skin tone attribute in a skin tone that matches the selected skin tone. For example, assume that the EIC 110 is currently displaying an array of one hundred emoji characters, fifty of which have a variable skin tone attribute. The global paint component 210 can change the appearance of each of those fifty emoji characters such that they have a skin tone that matches the selected skin tone.

An emoji selection processing component 212 performs processing in response to the user's selection of an emoji character that is being presented by the emoji collection presentation component 202. For instance, the emoji selection processing component 212 can forward the selected emoji character to the message-generating component 122. The message-generating component 122 may then add the emoji character to a message that is being created.

An emoji prediction component 214 identifies one or more predicted emoji characters based on the message information provided by the user via the message-generating component 122. The emoji prediction component 214 can operate in different ways in different respective implementations. In one implementation, the emoji prediction component 214 can map keywords in the message information to one or more emoji characters associated with those keywords. For example, the emoji prediction component 214 can map the word "angry" in the user's message to one or more emoji characters that are tagged with the keyword "angry." In another implementation, the emoji prediction component 214 can use a machine-learned model to map linguistic information in the message information to one or more appropriate emoji characters. The machine-learned model is trained based on a corpus of training data. Each example in the training data consists of a message, an emoji character, and some judgment as to whether the emoji character is relevant (or not) to the message.

Figure 3:
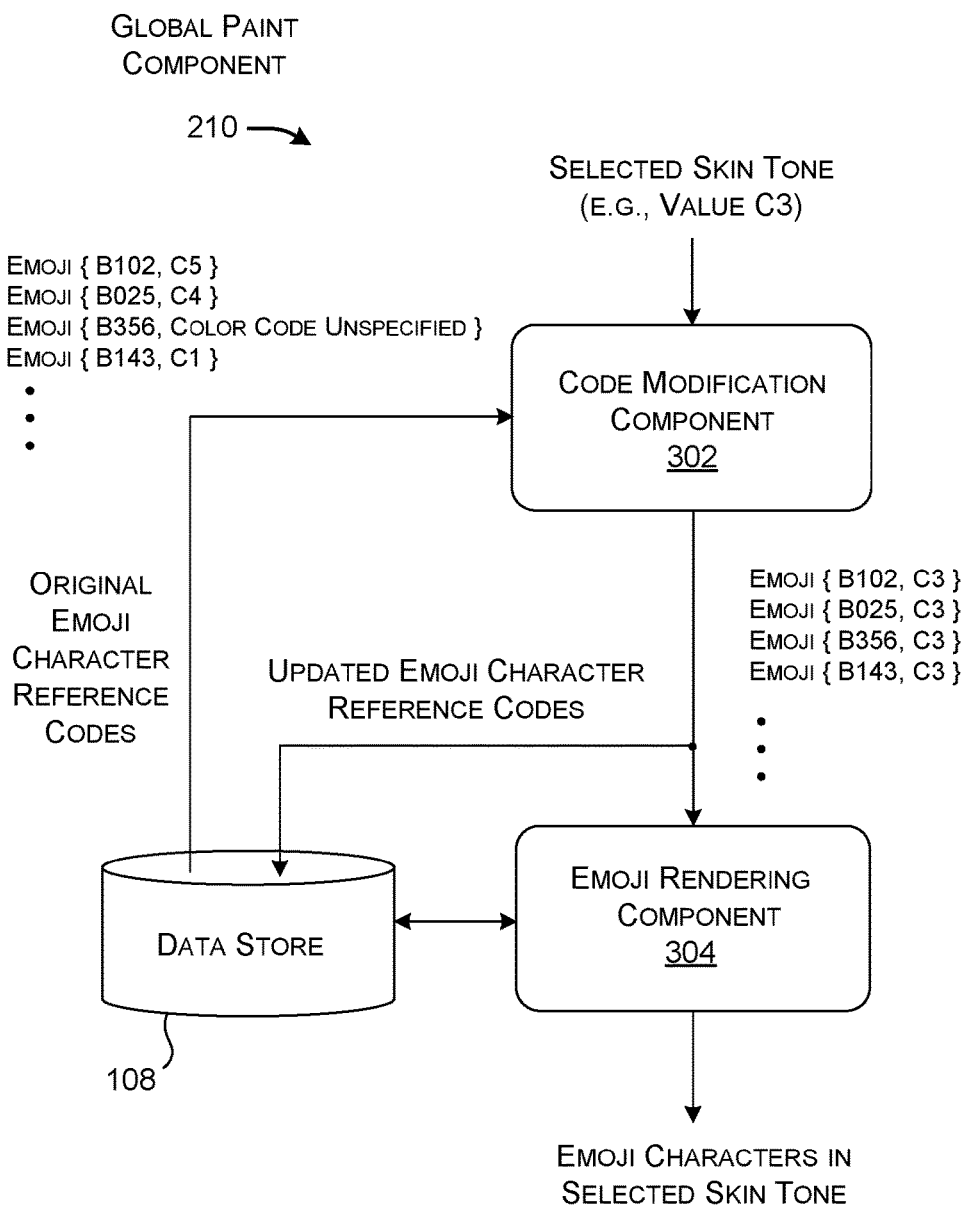
FIG. 3 shows one implementation of a global paint component, which is a part of the emoji interaction component of FIGS. 1 and 2.

FIG. 3 shows one implementation of the global paint component 210. In this implementation, each emoji character provided in the data store 108 is described by a base code, corresponding to any sequence of symbols (e.g., numbers) associated with that emoji character. Further, each skin tone is associated with a color code, corresponding to any sequence of symbols (e.g., numbers) associated with that color. In some implementations, the base codes and color codes may be standardized to promote meaningful exchange of information (e.g., text messages, Email messages, etc.) across different systems and devices. In other cases, the codes are not standardized because they are intended for use in the context of only one particular system or device.

A code modification component 302 receives the selected skin tone from the skin tone selection store 112. Then, for each emoji character in the collection of emoji characters in the data store 108 that has a variable skin tone attribute, the code modification component 302 replaces the current color code (if any) of that emoji character with the selected skin tone. For example, assume that, prior to modification, an emoji character has base code B102 and color code C5. Further assume that the selected skin tone is color code C3. The code modification component 302 will output {B102, C3} for this particular emoji character. The code modification component 302 can store the updated codes in the data store 108. An emoji rendering component 304 then renders each emoji character based on its respective base code and modified color code, together with the corresponding data item in the data store 108. As noted above, the data item for an emoji character specifies its appearance in any manner, e.g., using a bit map, vector representation, etc.

Figure 4:
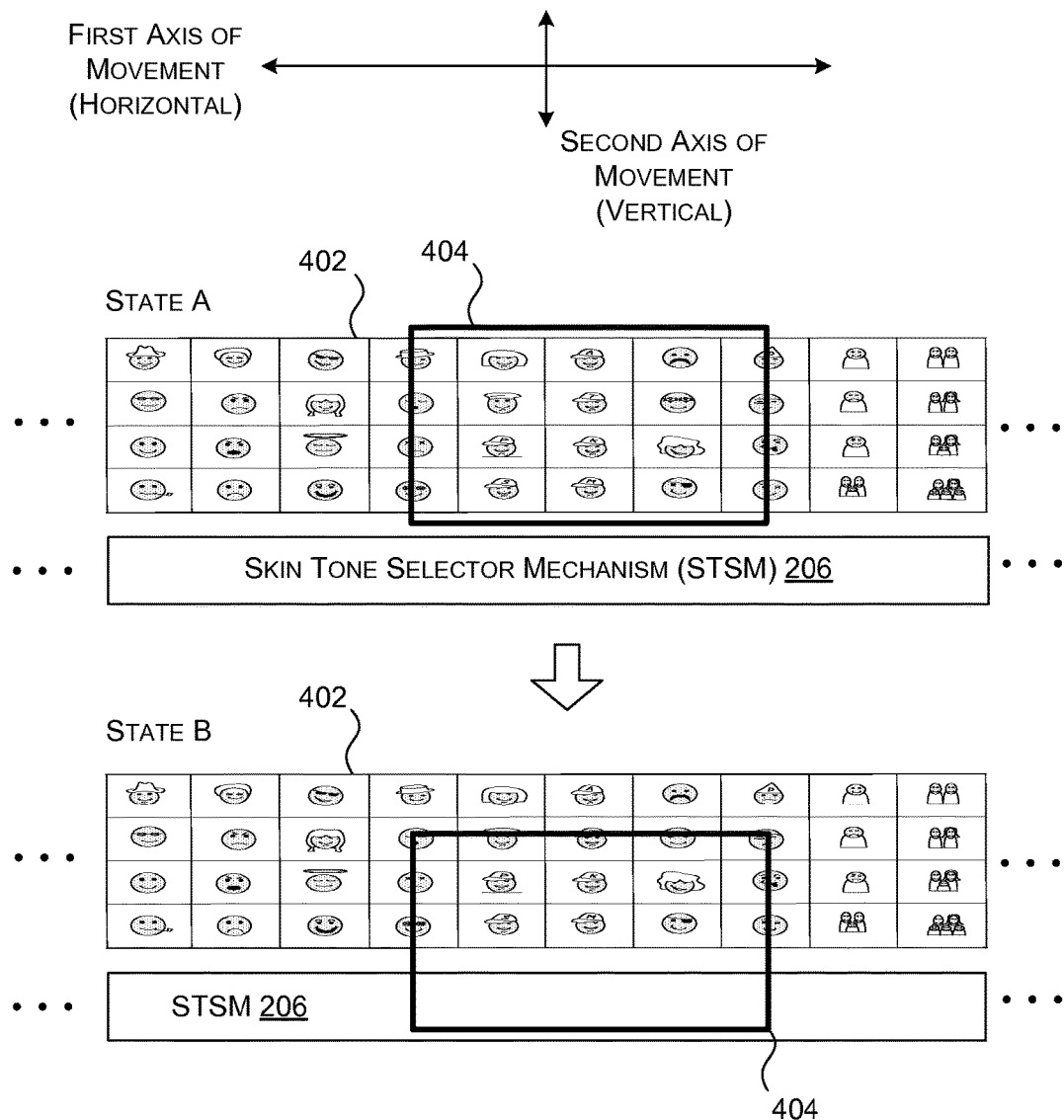
FIG. 4 shows a spatial relation between a collection of emoji characters and a skin tone selector mechanism (STSM), as provided by the emoji interaction component of FIGS. 1 and 2.

FIG. 4 shows a spatial relationship between a collection 402 of emoji characters and the skin tone selector mechanism (STSM) 206. The collection 402 of emoji characters forms an array defined by two dimensions. A first dimension, associated with a first axis of movement, corresponds to a horizontal dimension. A second dimension, associated with a second axis of movement, corresponds to a vertical dimension. In other implementations, the collection 402 of emoji characters can have more than two dimensions, and can accommodate navigation through the collection 402 along more than two axes of movement. For example, a user may interact with a user interface presentation that provides a depth dimension. A user may interact with such a user interface presentation using, for example, a depth camera input mechanism, such as the KINECT system provided by MICROSOFT Corporation of Redmond, Wash.

In the non-limiting example of FIG. 4, the collection 402 of emoji characters is four emoji characters high in the vertical dimension and n emoji characters in width in the horizontal direction, where n>>4. However, more generally, the array can have any dimensions m×n. For example, in other implementations, the collection 402 of emoji characters can have a length in the vertical direction that is greater than the width in the horizontal direction. In other words, other implementations can turn the depiction shown in FIG. 4 by 90 degrees, such that the longer dimension of the collection 402 extends in the vertical dimension.

A viewport 404 defines a scope of information that is presented by the EIC 110 to the user at any given time. As shown in state A, the viewport 404 shows only twenty emoji characters (or parts thereof), corresponding to a small subset of a much larger collection of emoji characters in the collection 402. Moreover, in state A, the viewport 404 does not encompass any part of the skin tone selector mechanism (STSM) 206. In contrast, in state B, the viewport 404 has "moved down" such that it now encompasses only fifteen of the above-noted twenty emoji characters (or parts thereof). But at this juncture, the viewport 404 shows the STSM 206. The particular scope of the viewport 404 shown in FIG. 4 is merely illustrative. In other implementations, the viewport 404 may encompass additional emoji characters, or fewer emoji characters, compared to the example of FIG. 4.

The EIC 110 allows the user to control what content is presented in the viewport 404 by panning the collection 402 of emoji characters. For example, with respect to the state A shown in FIG. 4, the user may execute a leftward pan gesture on the touch-sensitive surface 118 to show the emoji characters to the right of the viewport 404. The user may execute a rightward pan gesture to show the emoji characters to the left of the viewport 404. The user may execute an upward pan gesture in the collection 402 of emoji characters to show the STSM 206, thereby producing the condition associated with state B. The user may then perform a downward pan gesture to return to state A.

In other words, the STSM 206 can be visualized as spatially lying beneath the collection 402 of emoji characters. The user may access the STSM 206 at any time by panning up in the collection 402. In another implementation, as stated above, the collection 402 may have its "long" dimension along the vertical axis of movement. Here, the STSM 206 can be positioned to the left or the right of the collection 402. In this case, the user could access the STSM 206 by panning right or left, depending on which side of the collection 402 the STSM 206 exists.

According to another feature, the selector presentation component 204 is configured to present the same STSM 206 regardless of the user's position along the horizontal axis of movement. In other words, the selector presentation component 204 presents the same array of skin tone options regardless of where the user lies along the horizontal axis of movement.

Figure 5:
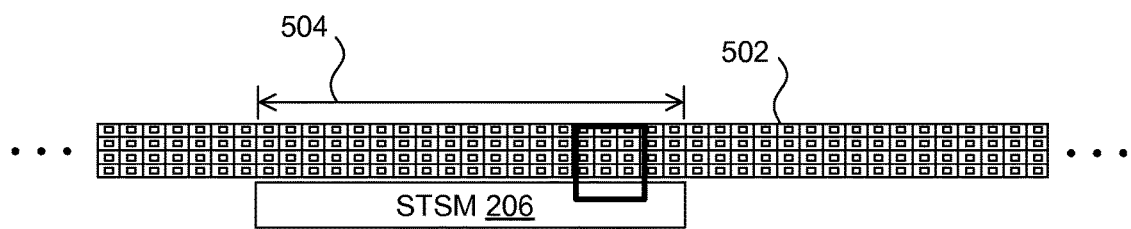
FIG. 5 shows another optional feature of the spatial relation between the collection of emoji characters and the STSM.

FIG. 5 shows another way of arranging the STSM 206 in relation to a collection 502 of emoji characters. Here, assume that the collection 502 of emoji characters includes a span 504 along the first axis of movement that groups together all of the emoji characters that have a variable skin tone attribute. In this case, the selector presentation component 204 only provides the STSM 206 when the user is positioned within the span 504. In other words, the selector presentation component 204 only presents the STSM 206 in those spans of the collection 502 where it is applicable.

Assume that the user is positioned outside the span 504, yet attempts to execute an upward pan gesture to access the STSM 206. The selector presentation component 204 can provide any user experience that conveys to the user that the STSM 206 is not available, such as by executing a small bump up in position in response to the user's gesture (but without showing the STSM 206), or by presenting an audio cue, etc.

A.2. Example

In one implementation, the computing device 102 of FIG. 1 can generate a user interface presentation 602 shown in FIGS. 6-11. More specifically, FIGS. 6-11 show the user interface presentation 602 in different respective states as the user creates a message, and, in the process, interacts with emoji characters.

Figure 6:
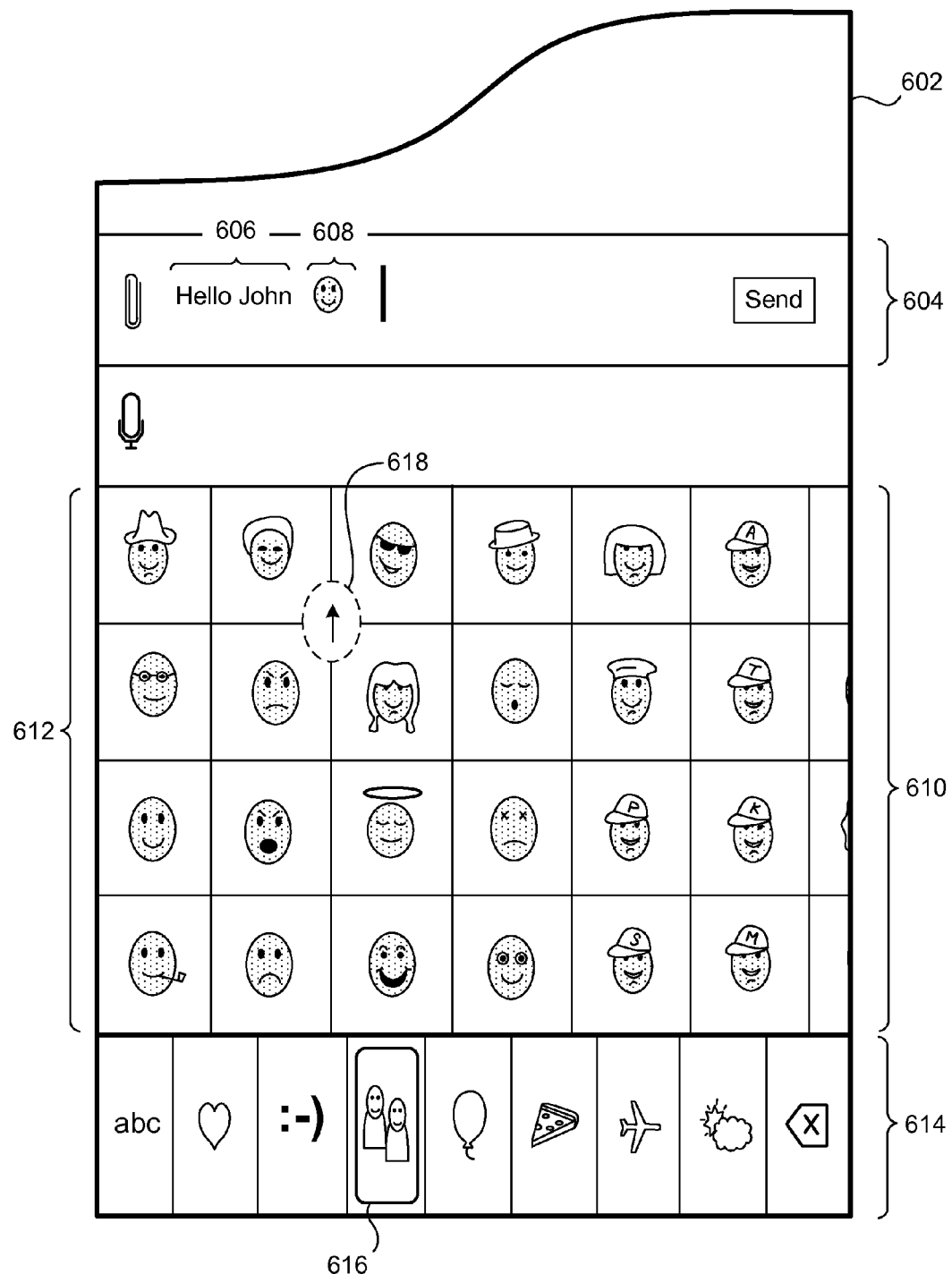
FIGS. 6-11 show different instantiations of a user interface presentation that may be provided by the computing device of FIG. 1.

Referring first to FIG. 6, the message-generating component 122 generates a message-composing region 604. The message-composing region 604 provides a workspace for the user to create a message, such as a text message. At the state shown in FIG. 6, the user has typed the text "Hello John" 606, and added an emoji character 608.

When an EIC-activation icon (not shown) has been activated, the EIC 110 displays a collection of emoji characters in an emoji display region 610, within a viewport 612. Here, the viewport 612 encompasses the same content as the emoji display region 610. Overall, the collection of emoji characters in the viewport 612 represents a subset of a larger collection of emoji characters.

An emoji topic region 614 presents icons associated with different emoji categories, such as a romance emoji category, a text-based emoji category, a people-related emoji category, a party-related emoji category, a food-related emoji category, a weather-related emoji category, and so on. Alternatively, the user may switch to a keyboard presentation by selecting an "abc" icon to the far left of the emoji topic region 614. Here, the user has selected an icon 616 that pertains to a people-related emoji category. In response to this selection, the EIC 110 has presented emoji characters in the emoji display region 610 that pertain to people. The EIC 110 can produce this result by moving the viewport 612 over a subsection of the master collection of emoji characters that includes people-related emoji characters. In other words, in one implementation, the master collection of emoji characters is already organized into different subject matter categories. Different regions along the horizontal axis of movement pertain to different subject matter categories. In another implementation, the EIC 110 can dynamically rearrange the positions of the emoji characters in the collection based on the category that the user has selected.

At the outset, the EIC 110 can display the people-related emoji characters such that they all have a neutral skin tone, such as, without limitation, a gray skin tone. Thus, each of the emoji characters in the emoji display region 610 has the same skin color, namely, gray. Likewise, the emoji character 608 that the user has already selected has a gray skin tone, presuming that the user has not yet changed the default skin tone of the emoji characters.

Assume that the user now wishes to select the skin tone of one or more emoji characters. To perform this task, the user may execute an upward-panning gesture, e.g., by placing a finger or other implement at a location 618 on the touch-sensitive surface 118, and then dragging the collection of emoji characters in a vertical direction. Presume that the user is within the span 504 shown in FIG. 5 in which the STSM 206 is available.

Figure 7:
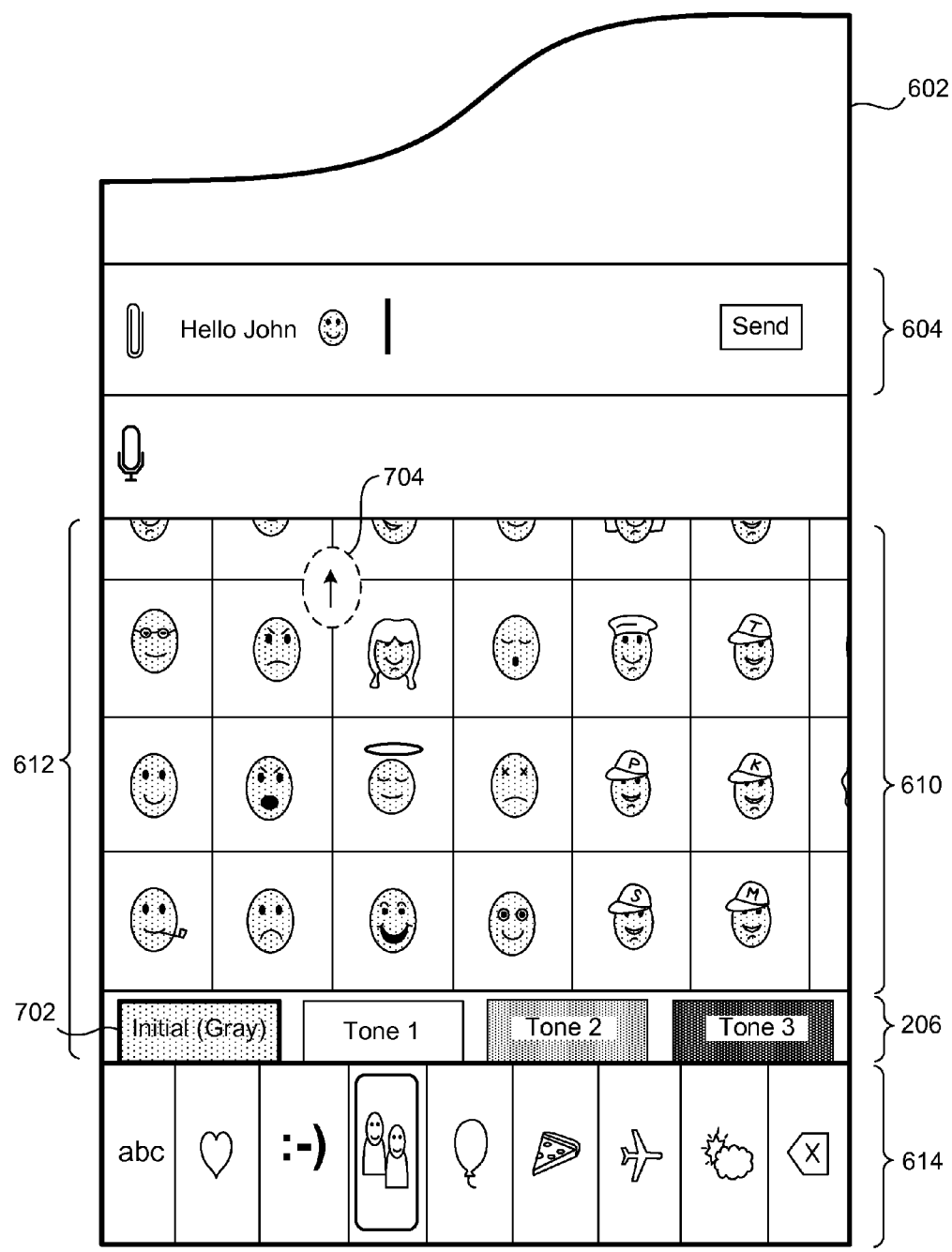

FIG. 7 shows the outcome of the user's panning gesture. The viewport 612 now includes the emoji display region 610 together with at least part of the skin tone selector mechanism (STSM) 206. More specifically, the viewport 612 now shows a visually truncated top row of emoji characters (whereas that top row of emoji characters was formerly presented in non-truncated form in FIG. 6). The viewport 612 also shows a top half of the STSM 206.

The STSM 206 includes a plurality of icons that represent different skin tone options. For example, here, the STSM 206 shows a plurality of bars with different colors. The different colors represent different respective skin tone options. More generally, the STSM 206 can show any number of skin tone options to represent different types of human skin color (and/or non-human skin colors, such as yellow or pink). The STSM 206 can also use different styles of icons to represent the skin tone options, such as icons that resemble human faces. In the present case, the STSM 206 shows an icon 702 in highlighted form, indicating that the skin tone associated with this icon 702 is currently selected. The currently-selected skin tone, in turn, corresponds to gray, the initially set default skin tone.

Assume that the user continues to move the collection of emoji characters in the upward direction. For example, the user may continue the panning gesture described above, e.g., by continuing to move his finger, now positioned at location 704, in the upward direction.

Figure 8:
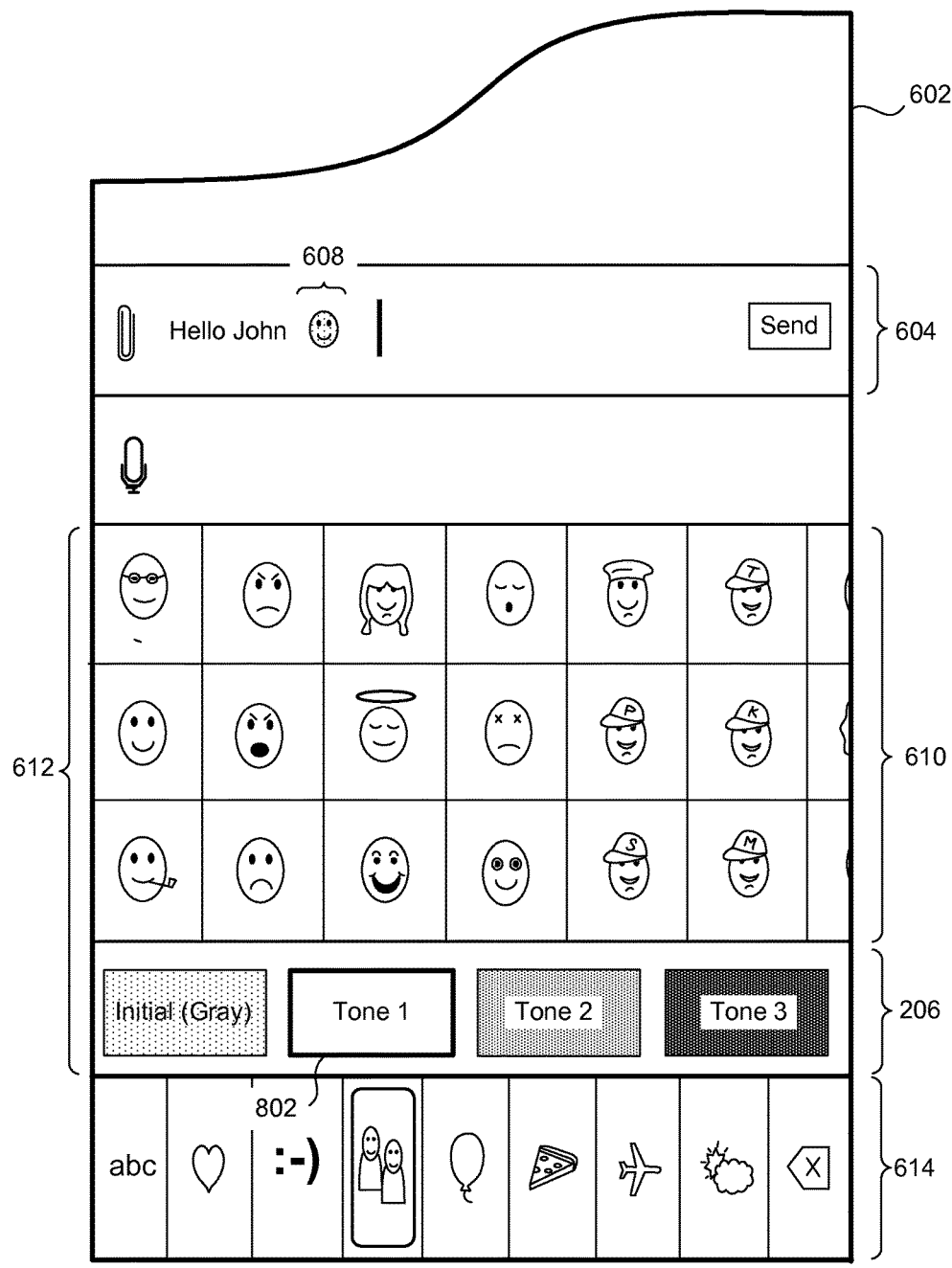

FIG. 8 shows the outcome of the above-described continued upward-panning gesture. The viewport 612 now entirely omits the top row of emoji characters and presents a full (non-truncated) version of the STSM 206. At this juncture, assume that the user opts to select skin tone option No. 1, associated with a skin tone icon 802. The user performs this task by touching or otherwise selecting the icon 802 on the touch-sensitive surface 118. In response to the selection, the EIC 110 displays the icon 802 in highlighted form. The EIC 110 can then optionally close the STSM 206, e.g., by performing an automatic downward pan movement. The EIC 110 can perform this behavior based on the presumption that the user has made his or her selection and therefore no longer needs to interact with the STSM 206. But an individual user can configure the EIC 110 to disable this behavior, after which the user would manually remove the STSM 206 upon making a selection.

At this juncture, the global paint component 210 of the EIC 110 displays all emoji characters having a variable skin tone attribute in a skin tone which matches the selected skin tone. In other words, the EIC 110 displays all of the emoji characters in the emoji display region 610 with the selected skin tone (assuming that all of these emoji characters have a variable skin tone attribute). In one implementation, the EIC 110 persists the selected skin tone until the user chooses another skin tone via the STSM 206. Thus, the selected skin tone may remain in place over plural user sessions and power-up/power-down events.

In one implementation, when the EIC 110 performs a global paint operation, the EIC 110 does not alter the skin tone of emoji characters that already been selected and added to the message (or which have already been selected and added to a set of favorite emoji characters). Hence, the EIC 110 does not change the gray skin tone of the emoji character 608 in the message-composing region 604 (or the skin tone of any emoji characters in the set of favorite emoji characters (not shown)). But in another implementation, the EIC 110 can also change the skin tone of already-selected emoji characters that appear in the message and/or the set of favorite emoji characters.

Other implementations of the STSM 206 can vary the appearance and/or functionality of the STSM 206, compared to the specific example shown in FIG. 8. For example, another implementation of the STSM 206 can provide a surface that can be panned in one or more dimensions to reveal additional options. Here, the user can execute panning within the STSM 206 in independent fashion to the panning that is performed within the emoji display region 610. For example, the STSM 206 can allow panning in the horizontal direction to reveal a range of skin tone options, not all of which are visible in the viewport 612 at any one time.

Figure 9:
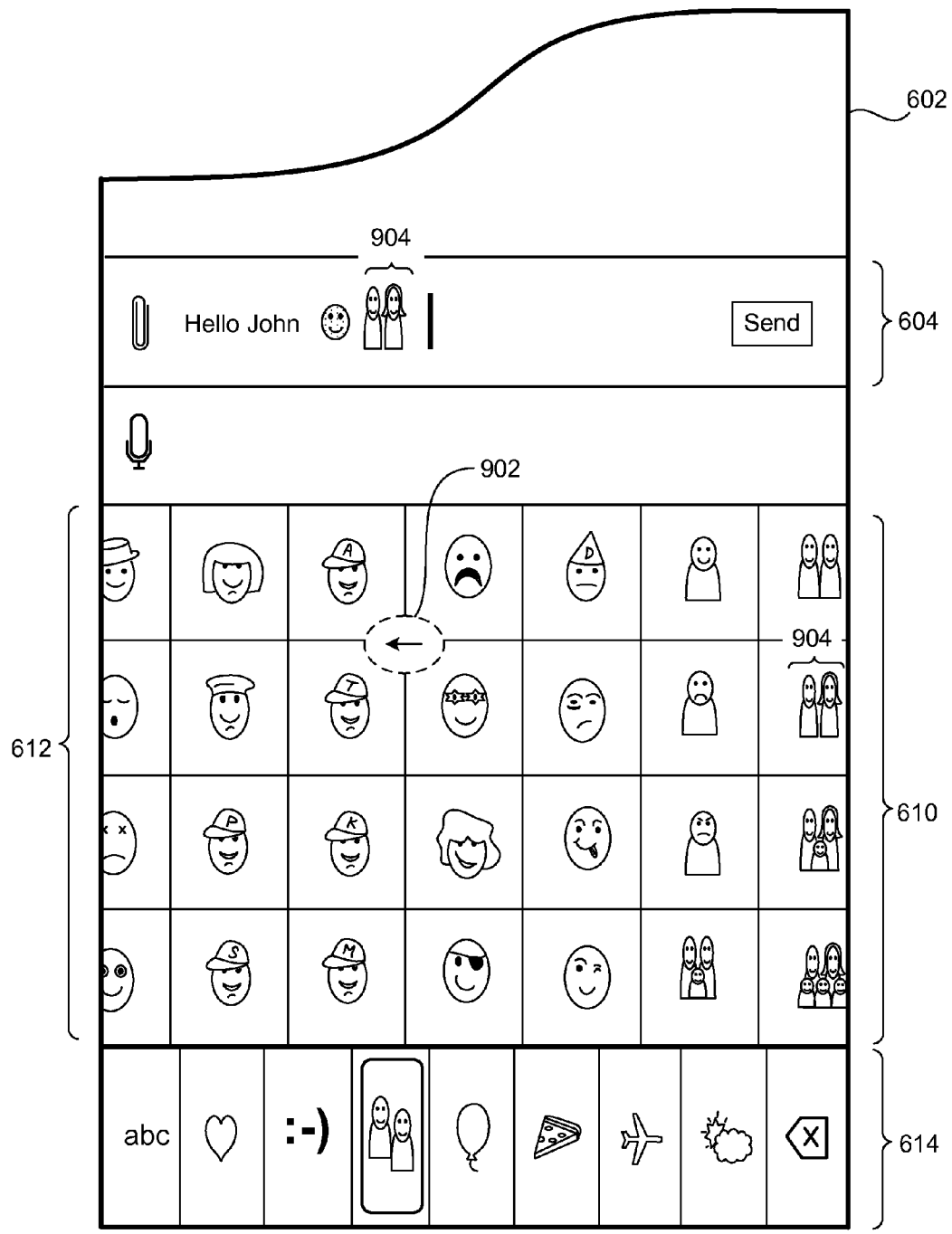

Advancing to FIG. 9, assume that the user now pans in the horizontal direction of the collection of emoji characters. The user can perform this task by placing his or her finger at position 902 on the touch-sensitive surface 118 and then executing a leftward panning gesture (as shown here) or a rightward panning gesture. Then assume that the user selects an emoji character 904 that appears in the viewport 612, causing the EIC 110 to add that emoji character 904 (and the code(s) associated therewith) to the message that the user is composing in the message-composing region 604. Note that all of the emoji characters in the emoji display region 610, as well as the newly selected emoji character 904 in the message-composing region 604, are displayed in the new selected tone color (skin tone No. 1).

Figure 10:
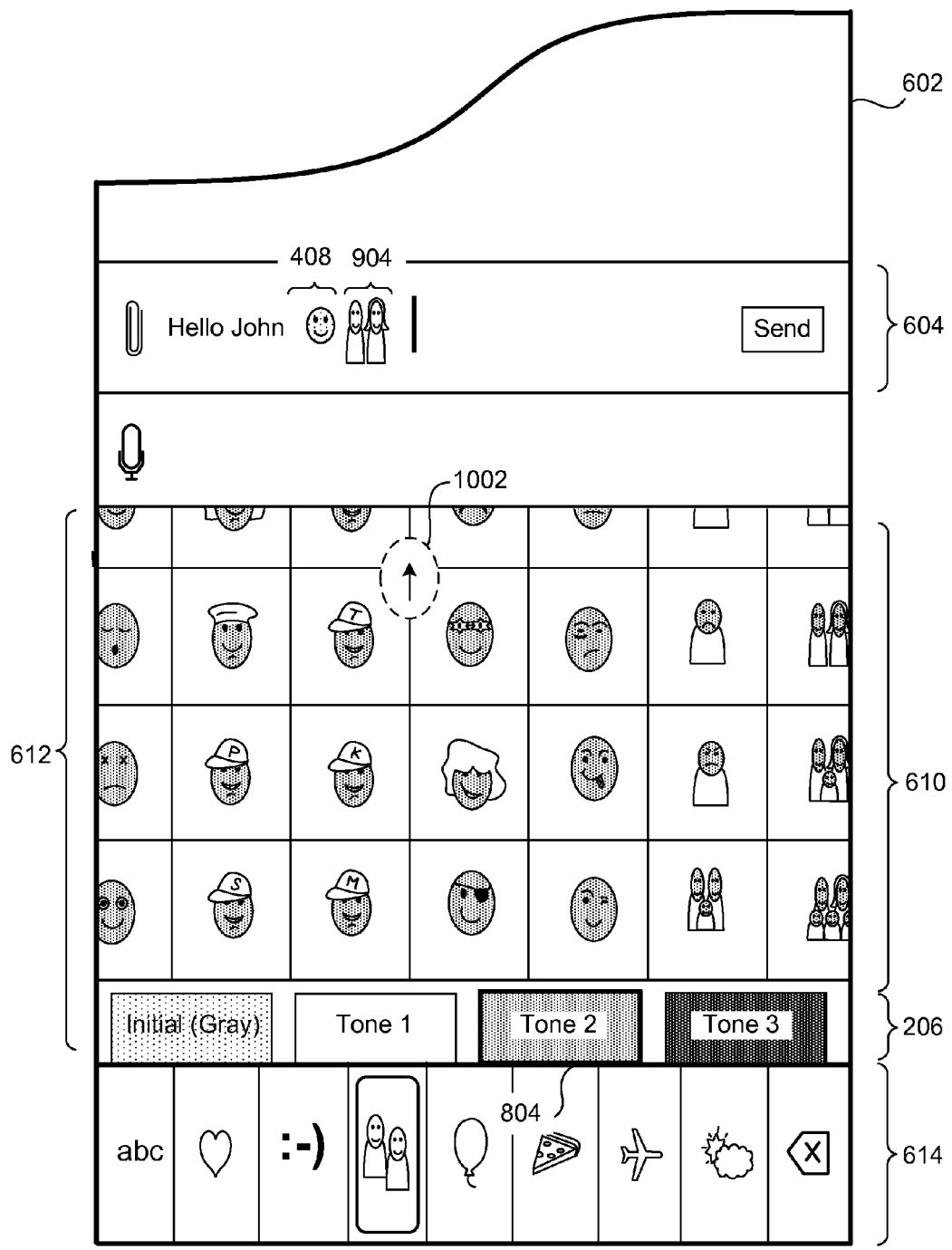

In FIG. 10, assume that the user now again executes an upward-panning gesture by touching the collection of emoji characters at position 1002 of the touch-sensitive surface 118, and then dragging the collection upwards. This gesture again reveals the STSM 206. Note that the STSM 206 that is presented in FIG. 10 has the same skin tone options as the STSM 206 as presented in FIG. 8. In other words, the EIC 110 presents the same STSM 206 regardless of the user's position along the horizontal axis of movement, assuming that the STSM 206 is available at a selected location. This feature makes the STSM 206 readily available to the user at all times along those spans of the horizontal axis in which it can be applied.

Now assume that the user changes the skin tone once again, e.g., by changing it from skin tone option No. 1 to skin tone option No. 2. In response, the EIC 110 highlights an icon 804 that is associated with skin tone option No. 2, closes the STSM 206, and displays all of the emoji characters in the emoji display region 610 in the new selected skin tone.

Figure 11:
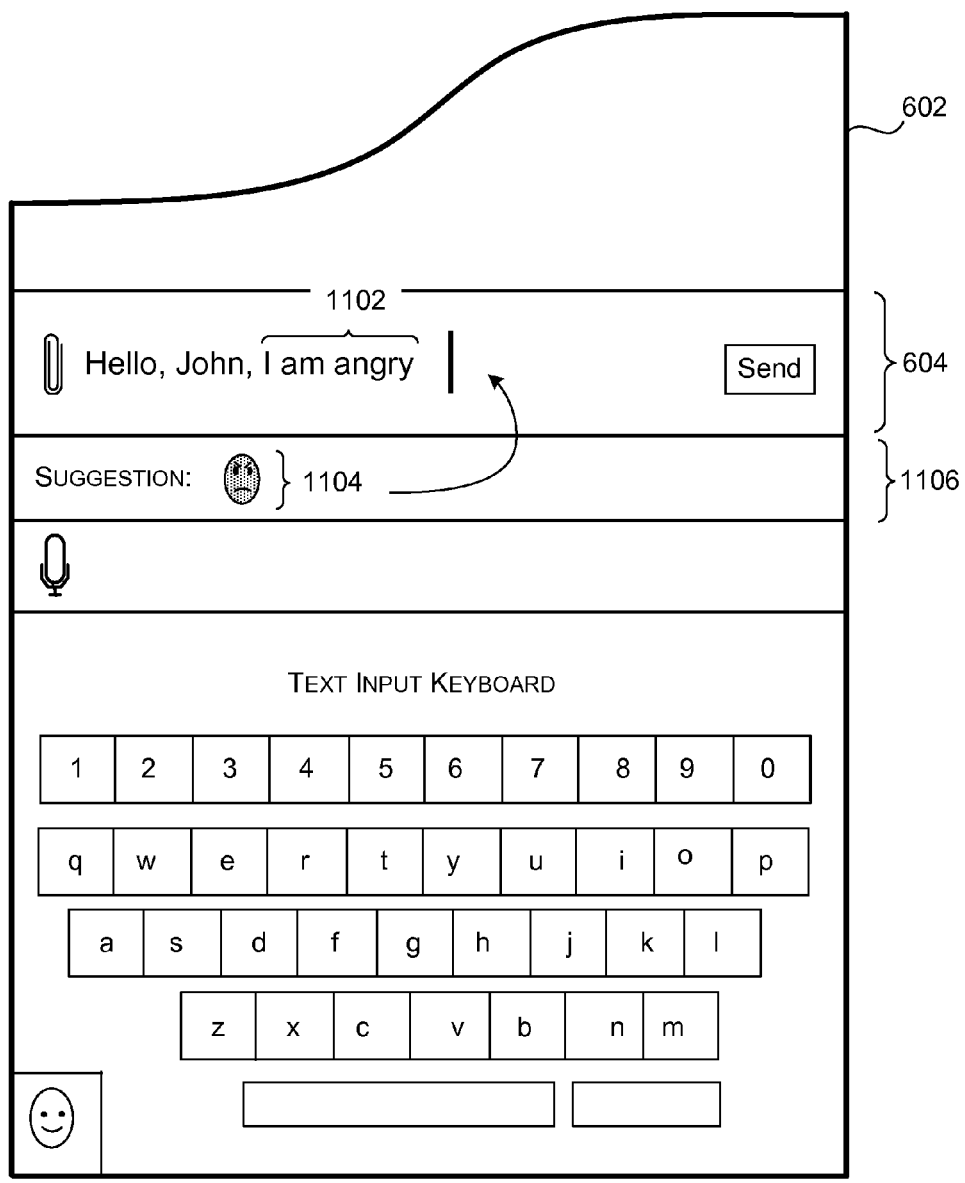

With reference to FIG. 11, assume that the user deletes the two emoji characters (608, 904) in the message-composing region 604 (shown in FIG. 10, but not in FIG. 11), and then types the new text 1102, "I am angry." In response, the emoji prediction component 214 maps the word "angry" to an emoji character 1104 associated with anger, and displays the emoji character 1104 in a suggestion region 1106. The user can optionally select the emoji character 1104 in the suggestion region 1106, whereupon the message-generating component 122 adds it to the message-composing region 604. Note that the emoji prediction component 214 presents the emoji character 1104 in the skin tone (skin tone No. 2) that the user has currently selected.

A.3. Additional Features

Figure 12:
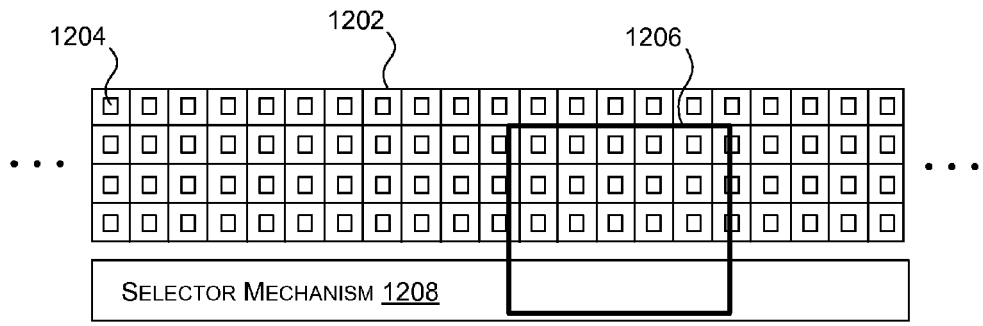
FIG. 12 is a generalized counterpart to FIG. 4, showing a spatial relation between a collection of graphical elements and a selector mechanism.

The principles set forth above can be extended to any context in which a user wishes to globally change the attribute values of a subset of graphical elements, within a collection of graphical elements. For instance, FIG. 12 shows a collection (e.g., an array) 1202 of graphical elements of any type or types. Graphical element 1204 represents one graphical element in the collection 1202. A viewport 1206 defines the scope of information that is made visible to the user at any given time. Like the example of FIG. 4, the user may pan the collection 1202 back and forth along a first (e.g., horizontal) axis of movement. The user may furthermore pan the collection 1202 along a second (e.g., vertical) axis of movement to reveal a selector mechanism 1208. The selector mechanism 1208 allows the user to globally change one or more attribute values of at least a subset of the graphical elements.

For example, in a shopping-related application, the graphical elements may represent thumbnail depictions of products and/or services that are available for purchase. The user may interact with the selector mechanism to globally change any attribute value of these products or services. For example, the graphical elements may represent different models of automobiles for purchase. The user may interact with the selector mechanism to globally change the colors of the automobiles to a selected color. In another case, the user may interact with the selector mechanism to select a particular type of tires for use with the automobiles, and so on.

Figure 13:
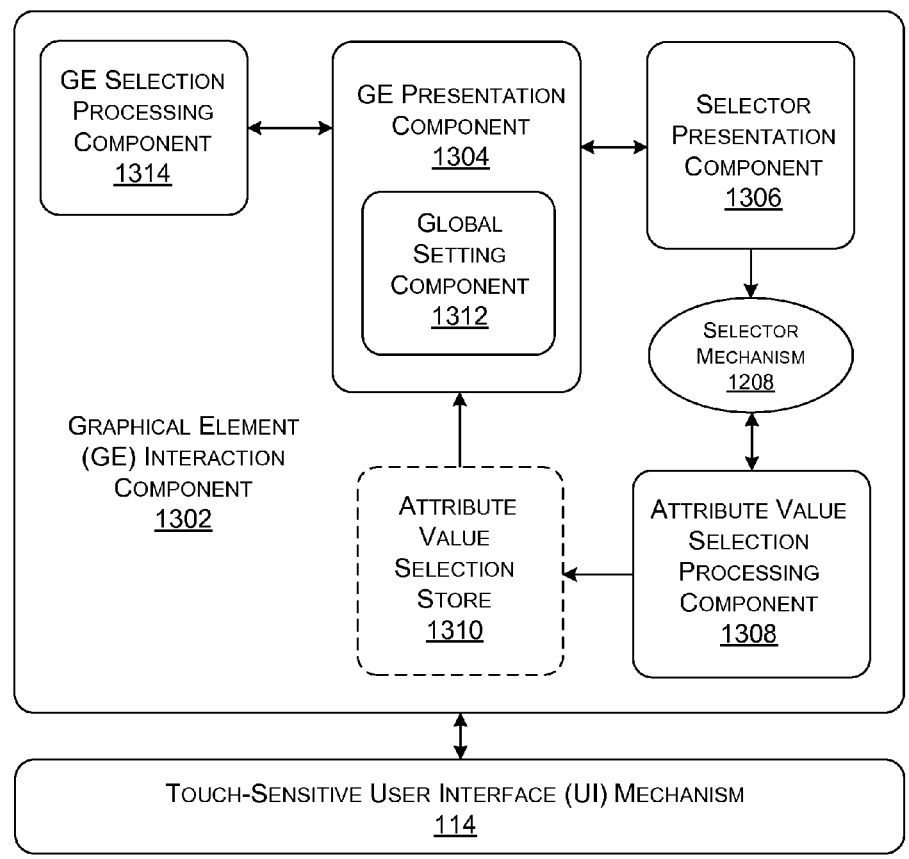
FIG. 13 is a generalized counterpart to FIG. 2, showing a graphical element interaction component.

FIG. 13 represents a generalized counterpart to FIG. 2. That figure shows a graphical element (GE) interaction component 1302 which allows a user to interact with any graphical elements, via the touch-sensitive user interface mechanism 114. As in the example of FIGS. 1 and 2, the touch-sensitive user interface mechanism 114 presents a user interface presentation on the display surface 116, and receives input from the user when the user touches the touch-sensitive surface 118.

The GE interaction component 1302 includes a graphical element presentation component 1304 that is configured to present a collection of graphical elements on the display surface 116, the collection being capable of being panned along a first axis of movement to reveal different parts of the collection of graphical elements. A selector presentation component 1306 is configured to detect that the user has engaged the touch-sensitive surface 118 of the user interface mechanism 114 to pan the collection of graphical elements along a second axis of movement. In response, the selector presentation component 1306 presents the selector mechanism 1208 on the display surface 116. The selector mechanism 1208 provides a plurality of attribute value options. Further, as indicated in FIG. 12, the selector mechanism 1208 appears as spatially proximate to the collection of graphical elements on the display surface 116 (e.g., as lying beneath the collection of graphical elements).

An attribute value selection processing component 1308 is configured to receive a selection by the user of one of the attribute value options, to provide a selected attribute value, in response to engagement by the user with the selector mechanism 1208 via the touch-sensitive surface 118. The attribute value selection processing component 1308 stores the selected attribute value in an attribute value selection store 1310. A global setting component 1312 is then configured to modify at least a subset of the graphical elements in the collection based on the selected attribute value, and to display graphical elements that have been modified on the display surface 116. The global setting component 1312 can store the modified graphical elements in a data store that is the counterpart of the data store 108 shown in FIG. 1. For example, the global setting component 1312 can store modified reference codes in that data store in the manner described above with respect to FIG. 3.

A GE selection processing component 1314 processes a user's selection of a graphical element. For example, in a shopping-related application, the GE selection processing component 1314 can add a product to a cart in response to the user's selection of a corresponding graphical element.

The EIC 110 (of FIG. 2) and the GE interaction component 1302 of FIG. 13 can also include additional features. To facilitate explanation, these additional features will be described with reference to the EIC 110, but they can also be used in conjunction with the GE interaction component 1302.

As one optional additional feature, the EIC 110 can present guidance to a user to assist the user in discovering the existence of the STSM 206 that lies beneath the emoji display region 610 (or wherever it happens to be provided in a particular implementation). For example, the EIC 110 can present a brief animated vignette (e.g., 3-5 second vignette) in which the emoji display region 610 is elevated to show the existence of the underlying STSM 206, and then dropped back down to conceal the STSM 206. The EIC 110 can present this animated vignette the first k times (e.g., three times) that a user interacts with the EIC 110 in the course of composing a message, after which it is assumed that the user will understand where the STSM 206 can be found. The EIC 110 can also give the user the ability to de-activate this feature via a configuration interface. In another case, the EIC 110 can initially present the viewport 612 such that a small portion of the upper part of the STSM 206 is visible. The EIC 110 can then rely on the user to manually pull the emoji display region 610 down via downward-panning gesture, so as to fully conceal the STSM 206.

As another optional feature, the EIC 110 can allow a user to lock one or more emoji characters such that their skin tones, once set, do not change when the user makes the above-described global skin color change.

As another optional feature, the EIC 110 can expand the STSM 206 such that it can be used to set the values of other attributes of emoji characters, not just skin tone. For example, the STSM 206 can allow the user to change the size of emoji characters, the transparency of emoji characters, the behavior of animated emoji characters, and so on.

As another optional feature, the system of FIG. 1 can include functionality which automatically propagates skin tone selections made by the user via a first user computing device to one or more other user computing devices that are also associated with the user. For instance, returning to FIG. 1, assume that, in addition to the user computing device 102, the user is associated with a group of one or more other user computing devices 128. For example, the user computing device 102 may correspond to a smartphone, whereas one of the other computing devices 128 may correspond to a tablet-type computing device. The system of FIG. 1 can propagate a skin tone selection made by the user via the user computing device 102 to each of the group of other user computing devices 128.

The system of FIG. 1 can perform the above task in different ways. In one case, the system can provide a global data store 130 at the remote computing system 104. The global data store 130 can store, for each user, the current codes associated with a collection of emoji characters, including the base codes and color codes associated with the emoji characters. In one manner of operation, when a user changes the skin tone via the user computing device 102, the global paint component 210 of the user computing device 102 sends the selected skin tone to the remote computing system 104. Upon receipt, the remote computing system 104 updates the user's emoji codes in the global data store 130, e.g., in the manner described above with respect to FIG. 3. Or the computing device 102 can locally generate the updated set of emoji codes and then send the updated emoji codes for storage in the global data store 130. Any other user computing device associated with the user can then consult the user's emoji codes in the global data store 130 when it seeks to present an emoji character, e.g., in the course of creating a new message that contains emoji characters. In other words, each computing device can use the global data store 130 as a global reference source that defines the composition of each emoji character, instead of, or in addition to, locally storing these emoji codes. The local data store 108 of each computing device can continue to store the data items (e.g., bit maps, vector representations, etc.) associated with the emoji characters.

In another implementation, the computing device 102 can send a peer-to-peer message to each of the other computing devices 128 which alerts the other computing devices to a new selected skin tone specified by the user via the computing device 102. Upon receipt of the message (e.g., when first coming online after the message has been sent), a recipient computing device can update its local data store 108 of emoji codes in the manner described above with respect to FIG. 3. Alternatively, instead of sending a message when a new skin tone is selected, the computing device 102 can update an entry in the global data store 130 that reflects the selected skin tone. Upon rendering an emoji character, another computing device associated with the user can consult the entry in the global data store 130 to determine the current skin tone, and then update its emoji codes if appropriate.

In conclusion to Section A, the EIC 110 and GE interaction component 1302 have various benefits. These benefits will be summarized with respect to the EIC 110, but they apply with equal force to the GE interaction component 1302. First, the EIC 110 provides an efficient mechanism for changing the skin tone of multiple emoji characters at the same time, e.g., rather than requiring the user to separately manipulate each emoji character to change its skin tone. In other words, the EIC 110 reduces the number of input actions that a user needs to perform to change the skin tone of multiple emoji characters. Second, the EIC 110 allows the user to efficiently access the STSM 206, regardless of the user's position in the collection of emoji characters. That is, the EIC 110 allows the user to pan up within the current viewport to obtain the STSM 206, wherever the user happens to be located along the horizontal axis of movement; no "hunting" for the STSM 206 is required. At the same time, the STSM 206 does not clutter the viewport when the user is not interacting with the STSM 206. Third, the EIC 110 provides mechanisms that facilitate the user's discovery of the STSM 206.

B. Illustrative Processes

Figure 14:
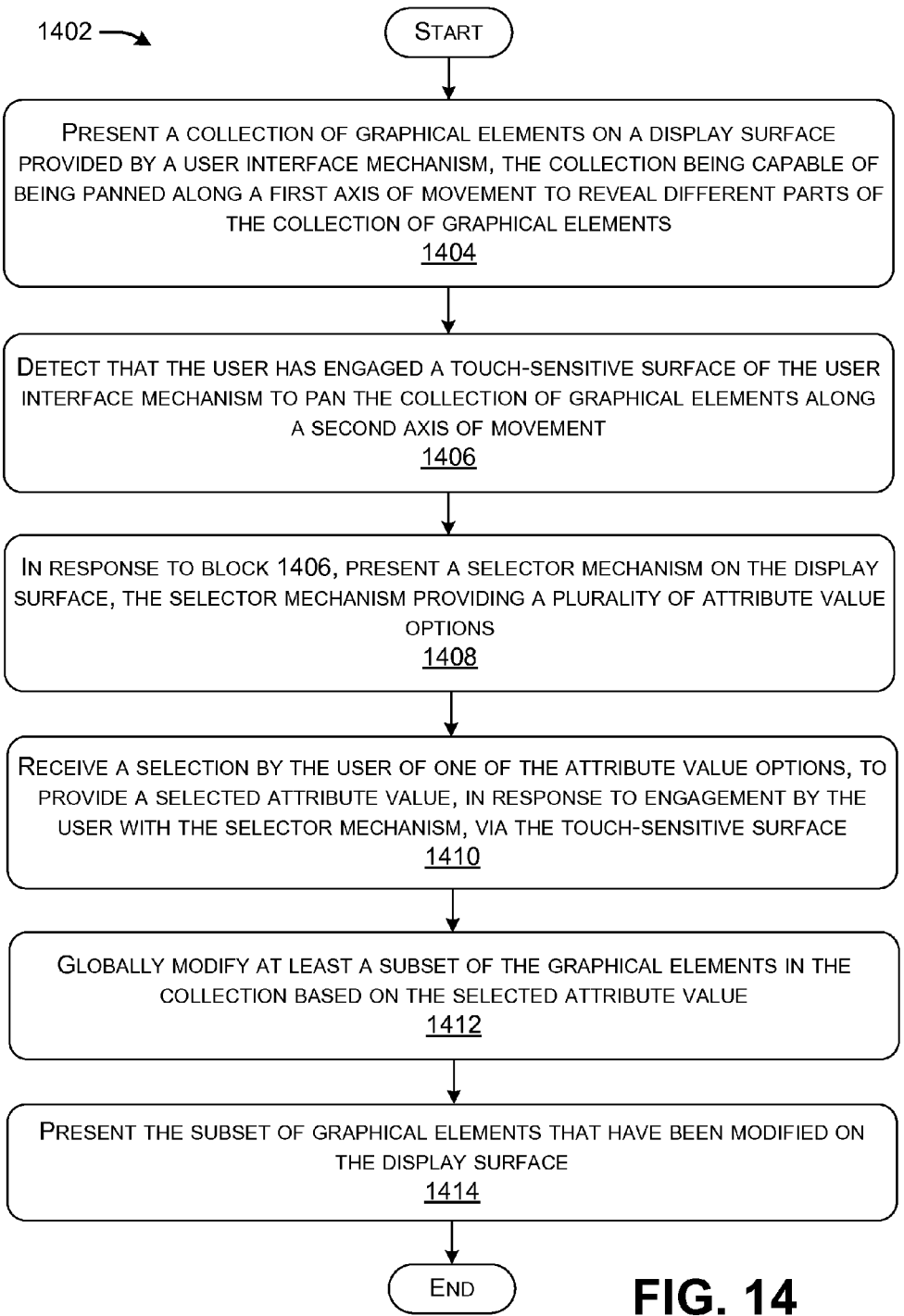
FIG. 14 shows a process that represents one manner of operation of the graphical element interaction component of FIG. 13.
Figure 15:
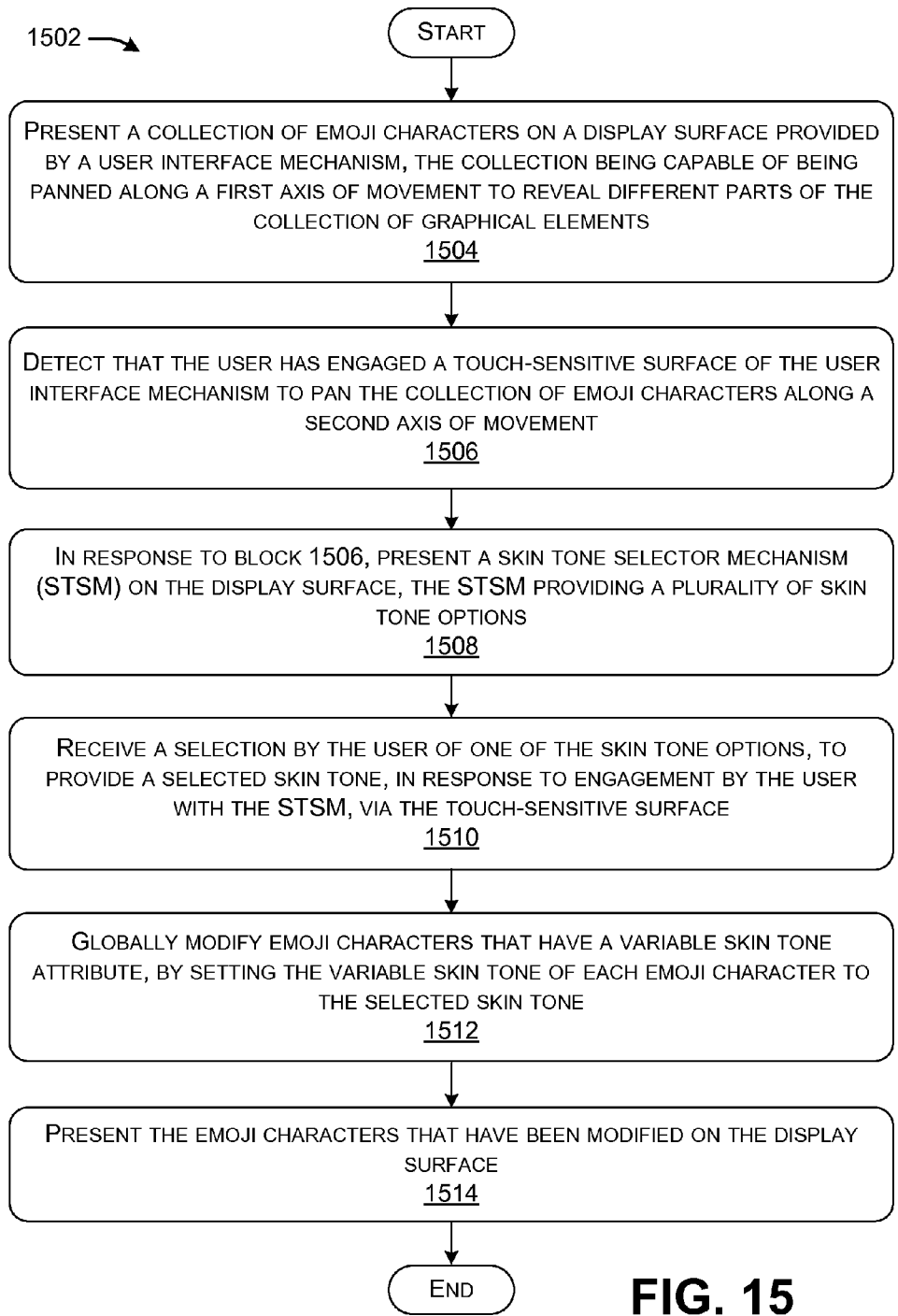
FIG. 15 shows a process that represents one manner of operation of the emoji interaction component of FIG. 2.
Figure 16:
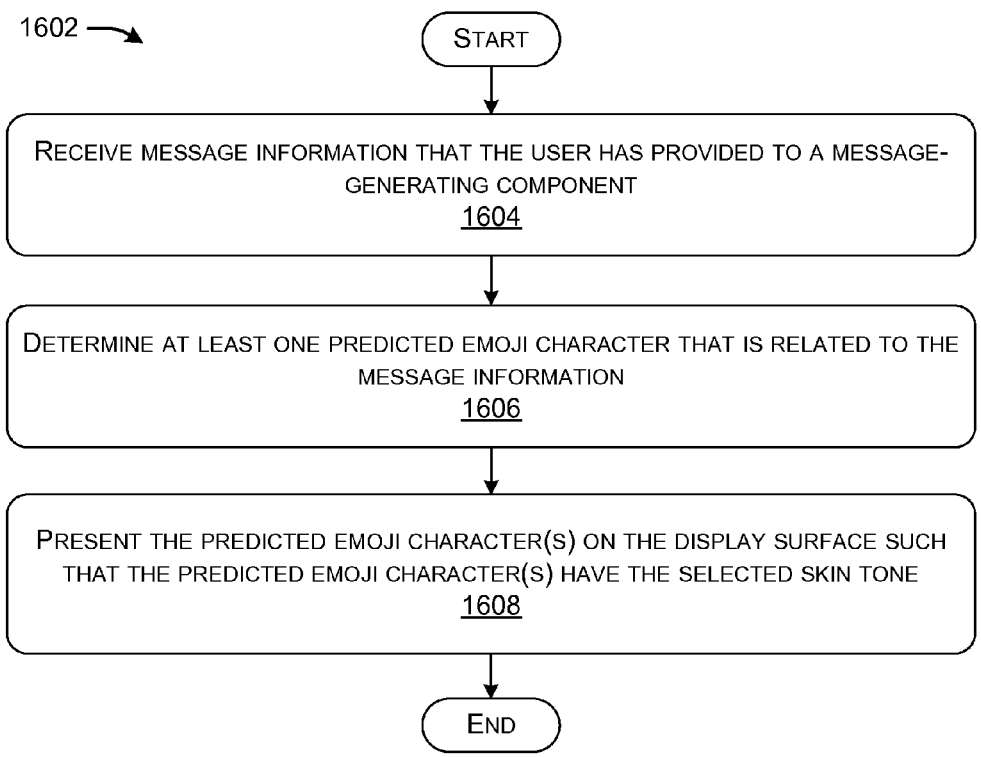
FIG. 16 shows a process that represents one manner of generating and presenting predicted emoji characters.

FIGS. 14-16 show processes that explain the operation of the graphical element (GE) interaction component 1302 and the emoji interaction component (EIC) 110 of Section A in flowchart form. Since the principles underlying the operation of the GE interaction component 1302 and the EIC 110 have already been described in Section A, certain operations will be addressed in summary fashion in this section. As noted in the prefatory part of the Detailed Description, the flowcharts are expressed as a series of operations performed in a particular order. But the order of these operations is merely representative, and can be varied in any manner.

Starting with FIG. 14, this figure shows a process 1402 by which the GE interaction component 1302 can set attribute values of graphical elements. In block 1404, the GE interaction component 1302 presents a collection 1202 of graphical elements on the display surface 116 provided by the user interface mechanism 114, the collection 1202 being capable of being panned along a first axis of movement to reveal different parts of the collection 1202 of graphical elements. In block 1406, the GE interaction component 1302 detects that the user has engaged the touch-sensitive surface 118 of the user interface mechanism 114 to pan the collection 1202 of graphical elements along a second axis of movement. In block 1408, and in response to block 1406, the GE interaction component 1302 presents the selector mechanism 1208 on the display surface 118, the selector mechanism 1208 providing a plurality of attribute value options, and the selector mechanism 1208 appearing as spatially proximate to the collection 1202 of graphical elements on the display surface 118. In block 1410, the GE interaction component 1302 receives a selection by the user of one of the attribute value options, to provide a selected attribute value, in response to engagement by the user with the selector mechanism 1208, via the touch-sensitive surface 118. In block 1412, the GE interaction component 1302 globally modifies at least a subset of the graphical elements in the collection 1202 based on the selected attribute value. In block 1414, the GE interaction component 1302 presents the subset of graphical elements that have been modified on the display surface 116.

FIG. 15 shows another process 1502 that represents a more detailed instantiation of the process 1402 of FIG. 14. In block 1504, the EIC 110 presents a collection 402 of emoji characters on the display surface 116 provided by the user interface mechanism 114, the collection 402 being capable of being panned along a first axis of movement to reveal different parts of the collection 402 of graphical elements. In block 1506, the EIC 110 detects that the user has engaged the touch-sensitive surface 118 of the user interface mechanism 114 to pan the collection 402 of emoji characters along a second axis of movement. In block 1508, and in response to block 1506, the EIC 110 presents the skin tone selector mechanism (STSM) 206 on the display surface 116, the STSM 206 providing a plurality of skin tone options, and the STSM 206 appearing as spatially proximate to the collection 402 of emoji characters on the display surface 116. In block 1510, the EIC 110 receives a selection by the user of one of the skin tone options, to provide a selected skin tone, in response to engagement by the user with the STSM 206, via the touch-sensitive surface 116. In block 1512, the EIC 110 globally modifies emoji characters that have a variable skin tone attribute, by setting the variable skin tone of each emoji character to the selected skin tone. In block 1514, the EIC 110 present the emoji characters that have been modified on the display surface 116.

FIG. 16 shows a process 1602 that represents on manner of presenting predicted emoji characters. In block 1604, the emoji prediction component 214 (of FIG. 2) receives message information that the user has provided via the message-generating component 122. In block 1606, the emoji prediction component 214 determines at least one predicted emoji character that is related to the message information. In block 1608, the emoji prediction component 214 presents the predicted emoji character(s) on the display surface 116 such that the predicted emoji character(s) have the selected skin tone.

C. Representative Computing Functionality

Figure 17:
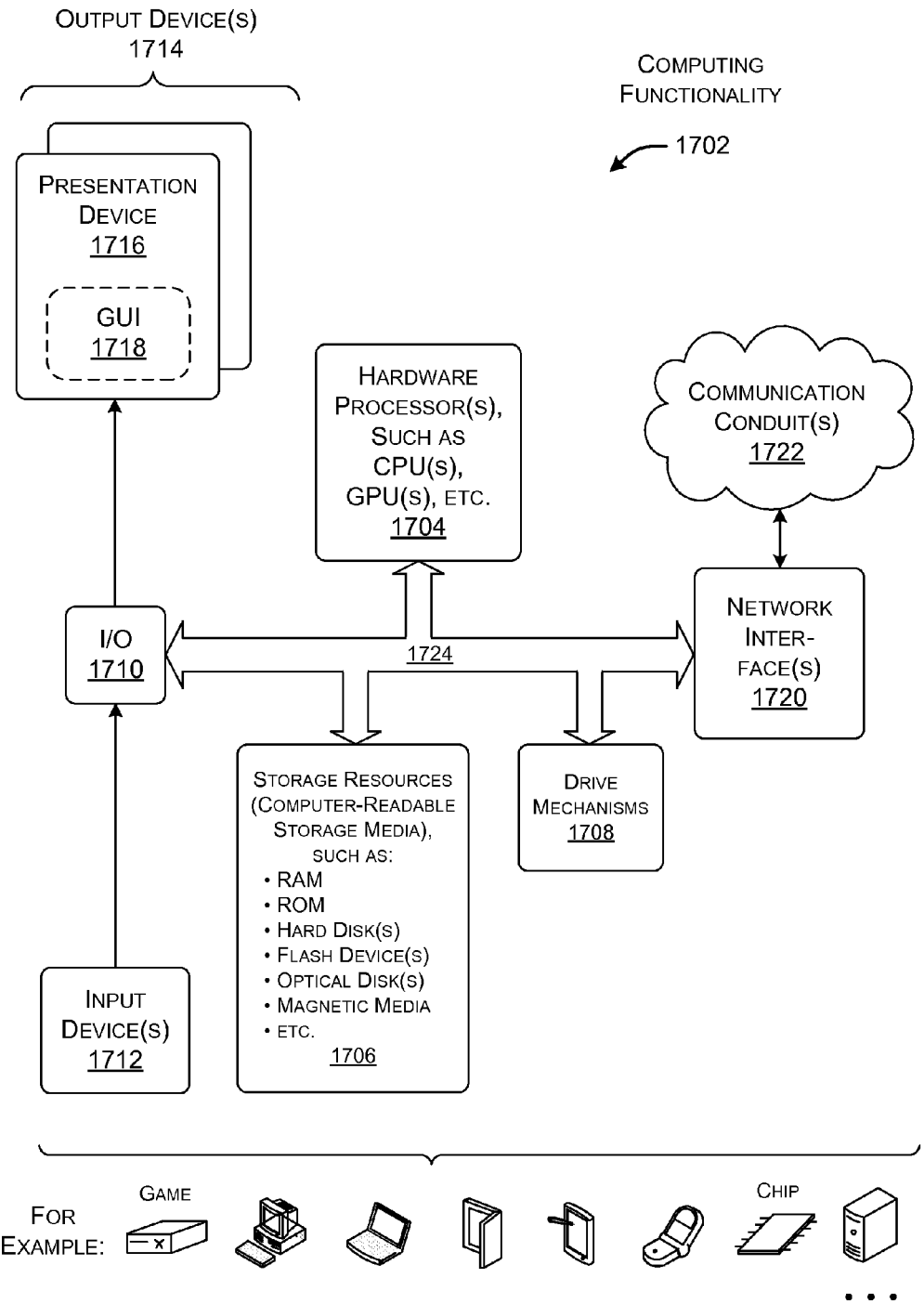
FIG. 17 shows illustrative computing functionality that can be used to implement any aspect of the features shown in the foregoing drawings.

FIG. 17 shows computing functionality 1702 that can be used to implement any aspect of the mechanisms set forth in the above-described figures. For instance, the type of computing functionality 1702 shown in FIG. 17 can be used to implement any of the computing device 102 shown in FIG. 1 and/or the remote computing system 104 shown in FIG. 1. In all cases, the computing functionality 1702 represents one or more physical and tangible processing mechanisms.

The computing functionality 1702 can include one or more hardware processors 1704, such as one or more central processing units (CPUs), and/or one or more graphical processing units (GPUs), and so on. The computing functionality 1702 can also include any storage resources (also referred to as computer-readable storage media or computer-readable storage medium devices) 1706 for storing any kind of information, such as machine-readable instructions, settings, data, etc. Without limitation, for instance, the storage resources 1706 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1702. The computing functionality 1702 may perform any of the functions described above when the hardware processor(s) 1704 carry out computer-readable instructions stored in any storage resource or combination of storage resources. The computing functionality 1702 also includes one or more drive mechanisms 1708 for interacting with any storage resource, such as a hard disk drive mechanism, an optical disk drive mechanism, and so on.

The computing functionality 1702 also includes an input/output component 1710 for receiving various inputs (via input devices 1712), and for providing various outputs (via output devices 1714). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1716 and an associated graphical user interface presentation (GUI) 1718. The presentation device 1716 may correspond to a physical monitor (e.g., a charge-coupled display device, a cathode ray tube device, a projection mechanism, etc.). Other output devices include a printer, a model-generating mechanism, a tactile output mechanism, an archival mechanism (for storing output information), and so on. The computing functionality 1702 can also include one or more network interfaces 1720 for exchanging data with other devices via one or more communication conduits 1722. One or more communication buses 1724 communicatively couple the above-described components together.

The communication conduit(s) 1722 can be implemented in any manner, e.g., by a local area computer network, a wide area computer network (e.g., the Internet), point-to-point connections, etc., or any combination thereof. The communication conduit(s) 1722 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1702 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a computing device is described herein for interacting with graphical elements. The computing device includes a user interface mechanism for presenting a user interface presentation on a display surface of the user interface mechanism, and for receiving input from a user when the user touches a touch-sensitive surface of the user interface mechanism. The computing device also includes a graphical element interaction component, which, in turn, includes a graphical element presentation component, a selector presentation component, and an attribute value selection processing component. The graphical element presentation component is configured to present a collection of graphical elements on the display surface, the collection being capable of being panned along a first axis of movement to reveal different parts of the collection of graphical elements. The selector presentation component is configured to: detect that the user has engaged the touch-sensitive surface of the user interface mechanism to pan the collection of graphical elements along a second axis of movement; and in response to the above-referenced detecting, present a selector mechanism on the display surface, the selector mechanism providing a plurality of attribute value options, and the selector mechanism appearing as spatially proximate to the collection of graphical elements on the display surface. The attribute value selection processing component is configured to receive a selection by the user of one of the attribute value options, to provide a selected attribute value, in response to engagement by the user with the selector mechanism via the touch-sensitive surface. The graphical element presentation component also includes a global setting component that is configured to modify at least a subset of the graphical elements in the collection based on the selected attribute value, and to display graphical elements that have been modified on the display surface.

According to a second aspect, in one implementation, the collection of graphical elements corresponds to a collection of emoji characters. The selector mechanism corresponds to a skin tone selector mechanism (STSM) that allows a user to select a skin tone from among a plurality of skin tone options, to provide a selected skin tone. And the global setting component is configured to modify a subset of emoji characters that have a variable skin tone attribute so that the emoji characters in the subset are displayed in the selected skin tone.

According to a third aspect, the computing device further includes an emoji prediction component that is configured to: receive message information that the user has input to message-generating component; determine at least one predicted emoji character that is related to the message information; and present the above-referenced at least one predicted emoji character on the display surface such that the above-referenced at least one predicted emoji character has the selected skin tone.

According to a fourth aspect, the first axis of movement is a horizontal axis of movement, and the second axis of movement is a vertical axis of movement.

According to a fifth aspect, the selector mechanism appears beneath the collection of graphical elements.

According to a sixth aspect, the first axis of movement is a vertical axis of movement, and the second axis of movement is a horizontal axis of movement.

According to a seventh aspect, the selector mechanism appears to the left or the right of the collection of graphical elements.

According to an eighth aspect, the selector presentation component is configured to present a same selector mechanism when the user pans along the second axis of movement, regardless of a current position along the first axis of movement.

According to a ninth aspect, the selector presentation component is configured to present the selector mechanism for only a span of the collection of graphical elements that includes graphical elements that are modifiable via the selector mechanism.

According to a tenth aspect, the graphical element presentation component and the selector presentation component are configured to provide an animated guide presentation on the display surface which reveals a location of the selector mechanism in relation to the collection of graphical elements.

According to an eleventh aspect, a computer-readable storage medium is described herein for storing computer-readable instructions. The computer-readable instructions, when executed by one or more processing devices, perform a method that includes: presenting a collection of emoji characters on a display surface provided by a user interface mechanism, the collection being capable of being panned along a first axis of movement to reveal different parts of the collection of graphical elements; detecting that the user has engaged a touch-sensitive surface of the user interface mechanism to pan the collection of emoji characters along a second axis of movement; in response to the above-referenced detecting operation, presenting a skin tone selector mechanism (STSM) on the display surface, the STSM providing a plurality of skin tone options, and the STSM appearing as spatially proximate to the collection of emoji characters on the display surface; receiving a selection by the user of one of the skin tone options, to provide a selected skin tone, in response to engagement by the user with the STSM, via the touch-sensitive surface; and globally modifying emoji characters that have a variable skin tone attribute, by setting the variable skin tone of each emoji character to the selected skin tone.

According to a twelfth aspect, a method is described herein, implemented by one or more computing devices, for interacting with graphical elements. The method includes: presenting a collection of graphical elements on a display surface provided by a user interface mechanism, the collection being capable of being panned along a first axis of movement to reveal different parts of the collection of graphical elements; detecting that the user has engaged a touch-sensitive surface of the user interface mechanism to pan the collection of graphical elements along a second axis of movement; in response to the above-referenced detecting, presenting a selector mechanism on the display surface, the selector mechanism providing a plurality of attribute value options, and the selector mechanism appearing as spatially proximate to the collection of graphical elements on the display surface; receiving a selection by the user of one of the attribute value options, to provide a selected attribute value, in response to engagement by the user with the selector mechanism, via the touch-sensitive surface; globally modifying at least a subset of the graphical elements in the collection based on the selected attribute value; and presenting the subset of graphical elements that have been modified on the display surface.

A thirteenth aspect corresponds to any combination (e.g., any permutation or subset) of the above-referenced first through twelfth aspects.

A fourteenth aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through thirteenth aspects.

In closing, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
a touch-sensitive surface;
a display surface;
a hardware processor; and
a storage resource storing machine-readable instructions which, when executed by the hardware processor, cause the hardware processor to:
display at least a part of a collection of emoji characters in an emoji display region of the display surface within a viewport, the collection being capable of being panned along a first axis of movement to reveal different parts of the collection of emoji characters in the viewport in response to detecting a first panning gesture along the first axis of movement on the touch-sensitive surface;
detect that a user has engaged the touch-sensitive surface to present a skin tone selector mechanism (STSM) using a second panning gesture along a second axis of movement on the touch-sensitive surface;
in response to detecting the second panning gesture-along the second axis of movement, present the STSM on the display surface, the STSM providing a plurality of skin tone options, and the STSM appearing in the viewport as spatially proximate to the collection of emoji characters on the display surface;
receive a selection by the user of one of the skin tone options to provide a selected skin tone, the selection being received via the STSM in response to user engagement of the touch-sensitive surface;
responsive to the selection of the selected skin tone via the STSM by the user using the touch-sensitive surface, modify a variable skin tone attribute of at least a plural subset of the collection of emoji characters that have the variable skin tone attribute to the selected skin tone; and
concurrently display at least a part of the at least the plural subset of the collection of emoji characters that have been modified to the selected skin tone in the emoji display region of the display surface.

2. The computing device of claim 1, wherein the machine-readable instructions, when executed by the hardware processor, cause the hardware processor to:
receive message information that the user has input;
determine at least one predicted emoji character that is related to the message information; and
present said at least one predicted emoji character on the display surface with the skin tone.

3. The computing device of claim 1, wherein the first axis of movement is a horizontal axis of movement, and the second axis of movement is a vertical axis of movement.

4. The computing device of claim 1, wherein the STSM appears beneath the collection of emoji characters.

5. The computing device of claim 1, wherein the first axis of movement is a vertical axis of movement, and the second axis of movement is a horizontal axis of movement.

6. The computing device of claim 5, wherein the STSM appears to the left or the right of the collection of emoji characters.

7. The computing device of claim 1, wherein the machine-readable instructions, when executed by the hardware processor, cause the hardware processor to: present the STSM in response to detecting the second panning gesture along the second axis of movement, regardless of a current position along the first axis of movement of the part of the collection of emoji characters being displayed.

8. The computing device of claim 1, wherein the machine-readable instructions, when executed by the hardware processor, cause the hardware processor to:
present the STSM in response to detecting the second panning gesture when the part of the collection of emoji characters being displayed includes the plural subset of the collection of emoji characters whose skin tone attribute is modifiable via the STSM.

9. The computing device of claim 1, wherein the machine-readable instructions, when executed by the hardware processor, cause the hardware processor to:
provide an animated guide presentation on the display surface which reveals a location of the STSM in relation to the collection of emoji characters.

10. A computer-readable storage medium storing computer-readable instructions, the computer-readable instructions, when executed by one or more hardware processors, causing the one or more hardware processors to:
display at least a part of a collection of emoji characters in an emoji display region of a display surface within a viewport, the collection being capable of being panned along a first axis of movement to reveal different parts of the collection of emoji characters in the viewport in response to detecting a first panning gesture along the first axis of movement on a touch-sensitive surface;
detect that a user has engaged the touch-sensitive surface to present a skin tone selector mechanism (STSM) using a second panning gesture along a second axis of movement on the touch-sensitive surface;
in response to detecting the second panning gesture, present the STSM on the display surface, the STSM providing a plurality of skin tone options, the STSM appearing in the viewport as spatially proximate to the collection of emoji characters on the display surface;
receive a selection by the user of one of the skin tone options to provide a selected skin tone, the selection being received via user engagement with the STSM using the touch-sensitive surface;
responsive to the selection of the selected skin tone using the touch-sensitive surface via the user engagement with the STSM, globally modify skin tones of at least a plural subset of the collection of emoji characters that have a variable skin tone attribute by setting the variable skin tone attribute of at least the plural subset of the collection of emoji characters to the selected skin tone; and
concurrently display at least a part of the at least the plural subset of the collection of emoji characters that have been modified to the selected skin tone in the emoji display region of the display surface.

11. The computer-readable storage medium of claim 10, wherein the first axis of movement is a horizontal axis of movement, and wherein the second axis of movement is a vertical axis of movement, and wherein the STSM appears beneath the collection of emoji characters.

12. The computer-readable storage medium of claim 10, wherein the same STSM is presented in response to detecting the second panning gesture along the second axis of movement, regardless of a current position along the first axis of movement of the part of the collection of emoji characters being displayed.

13. The computer-readable storage medium of claim 10, wherein the computer-readable instruction further cause the one or more hardware processors to:

receive message information that the user has provided;
determine at least one predicted emoji character that is related to the message information; and
responsive to the selection by the user of the selected skin tone, present the at least one predicted emoji character to the user such that said at least one predicted emoji character has the selected skin tone.

14. A method implemented by one or more computing devices, the method comprising:
displaying at least a part of a collection of emoji characters in an emoji display region of a display surface within a viewport, the collection being capable of being panned along a first axis of movement to reveal different parts of the collection of emoji characters in the viewport in response to detecting a first panning gesture along the first axis of movement on a touch-sensitive surface;
detecting that a user has engaged the touch-sensitive surface to present a skin tone selector mechanism (STSM) using a second panning gesture along a second axis of movement on a touch-sensitive surface;
in response to detecting the second panning gesture, presenting the STSM on the display surface, the STSM providing a plurality of skin tone options, and the STSM appearing in the viewport as spatially proximate to the collection of emoji characters on the display surface;
receiving a selection by the user of one of the skin tone options to provide a selected skin tone, the selection being received via the STSM in response to the user engagement of the touch-sensitive surface;
responsive to the selection of the selected skin tone using the touch-sensitive surface, globally modifying a variable skin tone attribute of at least a plural subset of the collection of emoji characters that have the variable skin tone attribute to have the selected skin tone; and
concurrently displaying at least a part of the at least the plural subset of the collection of emoji characters that have been modified to have the selected skin tone in the emoji display region on the display surface.

15. The method of claim 14, further comprising:
receiving message information that the user has provided;
determining at least one predicted emoji character that is related to the message information; and
presenting said at least one predicted emoji character on the display surface, such that said at least one predicted emoji character has the selected skin tone.

16. The method of claim 14, wherein the first axis of movement is a horizontal axis of movement, wherein the second axis of movement is a vertical axis of movement, and wherein the STSM appears beneath the collection of emoji characters.

17. The method of claim 14, further comprising:
continuing to present more of the STSM as the user continues to use the second panning gesture-along the second axis of movement.

18. The method of claim 14, further comprising:
providing an animated guide presentation on the display surface which
reveals a location of the STSM in relation to the collection of emoji characters.

19. The method of claim 14, wherein the first axis of movement is a vertical axis of movement, wherein the second axis of movement is a horizontal axis of movement, and wherein the STSM appears to the left or the right of the collection of emoji characters.

20. The method of claim 14, further comprising:
presenting the STSM in response to detecting the second panning gesture along the second axis of movement, regardless of a current position along the first axis of movement of the part of the collection of emoji characters being displayed.

* * * * *